(12) United States Patent
Niemela et al.

(10) Patent No.: US 11,638,411 B2
(45) Date of Patent: May 2, 2023

(54) TRANSPORT TRAILER WITH DEPLOYABLE CORRAL

(71) Applicant: NB4 Brand L.L.C., Chassell, MI (US)

(72) Inventors: Marcus Niemela, Scottsdale, AZ (US); Cal G. Niemela, Chassell, MI (US); Cole S. Stout, Dollar Bay, MI (US)

(73) Assignee: The Kingstar Company, Chassel, MI (US)

( * ) Notice: Subject to any disclaimer, the term of this patent is extended or adjusted under 35 U.S.C. 154(b) by 467 days.

(21) Appl. No.: 16/836,183

(22) Filed: Mar. 31, 2020

(65) Prior Publication Data

US 2020/0305386 A1 Oct. 1, 2020

Related U.S. Application Data

(60) Provisional application No. 62/827,241, filed on Apr. 1, 2019.

(51) Int. Cl.
*A01K 3/00* (2006.01)
*B60P 3/04* (2006.01)
*A01K 1/00* (2006.01)

(52) U.S. Cl.
CPC ............ *A01K 3/001* (2021.08); *A01K 1/0035* (2013.01); *B60P 3/04* (2013.01)

(58) Field of Classification Search
CPC ...... A01K 3/001; A01K 1/0035; A01K 1/105; A01K 3/005; B60D 3/04; E04H 17/18; B60P 3/04
See application file for complete search history.

(56) References Cited

U.S. PATENT DOCUMENTS

| | | | |
|---|---|---|---|
| 238,243 A | 3/1881 | Mitchell | |
| 3,019,763 A | 2/1962 | Ferris | |
| 3,387,825 A | 6/1968 | Kreeger | |
| 3,574,388 A | 4/1971 | Stone | |
| 3,636,594 A * | 1/1972 | Faivre | A43C 9/04 24/715.4 |
| 3,726,256 A | 4/1973 | Bernhardt et al. | |
| 3,741,529 A | 6/1973 | Blagg | |

(Continued)

OTHER PUBLICATIONS

Brochure entitled "TNC Travel N Corrals, Lightweight Portable Corrals", published on or before Jul. 6, 2016.

*Primary Examiner* — Ebony E Evans
(74) *Attorney, Agent, or Firm* — Gardner, Linn, Burkhart & Ondersma LLP

(57) ABSTRACT

A deployable corral system for any upright wall, including a wall of a transport trailer, provides a readily deployable corral along the trailer, and is readily stowable along the trailer in a retracted configuration for travel. The corral includes a pair of spaced-apart and extendable corral rails with a pivoting cross-rail extending from the distal end of each extendable corral rail. When the extendable corral rails are extended the cross-rails are spaced from an exterior side of the livestock trailer, and when the extendable corral rails are retracted the cross-rail is positioned near an upright wall of the trailer. The deployable corral system optionally includes a manual deployment assist system to assist a user during deployment and stowage of the corral. Additional features may include a deployable shade awning, a deployable trough, and extendable vertical support stands.

24 Claims, 18 Drawing Sheets

(56) References Cited

U.S. PATENT DOCUMENTS

| | | | | |
|---|---|---|---|---|
| 3,828,733 | A | 8/1974 | Correia | |
| 3,921,585 | A * | 11/1975 | Hall | B60P 3/04 |
| | | | | 119/512 |
| 3,938,470 | A * | 2/1976 | Pace | A01J 5/017 |
| | | | | 119/14.08 |
| 3,943,890 | A | 3/1976 | Calia | |
| 3,970,045 | A | 7/1976 | Graham, Jr. | |
| 3,973,553 | A * | 8/1976 | Lanciault | B60H 1/00364 |
| | | | | 126/622 |
| 4,052,098 | A | 10/1977 | Metz | |
| 4,090,472 | A | 5/1978 | York | |
| 4,153,011 | A | 5/1979 | Weissman et al. | |
| 4,159,142 | A * | 6/1979 | Larson | B60P 3/04 |
| | | | | 119/515 |
| 4,168,933 | A | 9/1979 | Kane | |
| 4,250,836 | A | 2/1981 | Smith | |
| 4,333,673 | A * | 6/1982 | Kerr | A01K 1/0017 |
| | | | | 292/216 |
| 4,355,594 | A | 10/1982 | Wagner | |
| 4,468,046 | A | 8/1984 | Rutherford | |
| 4,494,733 | A | 1/1985 | Olsson | |
| 4,537,151 | A | 8/1985 | Bolton | |
| 4,659,136 | A | 4/1987 | Martin et al. | |
| 4,733,899 | A | 3/1988 | Keys | |
| 4,958,594 | A | 9/1990 | Swagerty | |
| 4,964,768 | A | 10/1990 | Shomo | |
| RE33,959 | E | 6/1992 | Mollhagen | |
| 5,235,468 | A | 8/1993 | Stephens | |
| 5,240,301 | A | 8/1993 | Arnold | |
| 5,303,947 | A | 4/1994 | Gerber | |
| 5,361,929 | A | 11/1994 | McLain et al. | |
| 5,427,486 | A | 6/1995 | Green | |
| 5,490,705 | A | 2/1996 | Barr | |
| 5,513,595 | A | 5/1996 | Chatterton | |
| 5,688,087 | A | 11/1997 | Stapleton et al. | |
| 5,715,641 | A | 2/1998 | Hall, Jr. | |
| 5,738,037 | A | 4/1998 | Mahan | |
| 5,738,341 | A | 4/1998 | Lease | |
| 5,810,412 | A | 9/1998 | Hall | |
| 5,887,928 | A | 3/1999 | Fenske | |
| 5,909,717 | A * | 6/1999 | Randall | A01K 5/0114 |
| | | | | 119/58 |
| 5,924,385 | A | 7/1999 | Cossel | |
| 6,067,940 | A | 5/2000 | Holder | |
| 6,077,007 | A | 6/2000 | Porter et al. | |
| 6,206,624 | B1 | 3/2001 | Brandenburg | |
| 6,257,558 | B1 | 7/2001 | Levine et al. | |
| 6,283,537 | B1 | 9/2001 | DeVore, III | |
| 6,450,124 | B1 * | 9/2002 | Calvert | A01K 3/00 |
| | | | | 119/512 |
| 6,467,433 | B1 * | 10/2002 | Stanton | A01K 3/00 |
| | | | | 119/512 |
| 6,477,985 | B1 | 11/2002 | Mennenga et al. | |
| 6,499,435 | B2 | 12/2002 | Markham | |
| 6,557,329 | B2 | 5/2003 | Schmidt | |
| 6,571,744 | B1 | 6/2003 | Olson et al. | |
| 6,595,496 | B1 | 7/2003 | Langlie et al. | |
| 6,622,436 | B1 | 9/2003 | Kretsch | |
| 6,662,751 | B1 | 12/2003 | Rutter | |
| 6,691,644 | B1 * | 2/2004 | Anderson | A01K 1/0088 |
| | | | | 119/515 |
| 6,729,267 | B2 | 5/2004 | Campbell | |
| 6,755,155 | B2 | 6/2004 | May | |
| 6,863,029 | B1 | 3/2005 | Neufelder | |
| 6,866,252 | B2 | 3/2005 | Pulliam | |
| 6,895,897 | B1 | 5/2005 | Culp | |
| 7,004,525 | B1 | 2/2006 | Turnbow | |
| 7,325,513 | B1 * | 2/2008 | Velasquez | B60P 3/04 |
| | | | | 119/512 |
| 7,350,480 | B1 * | 4/2008 | Hughes | A01K 3/005 |
| | | | | 119/512 |
| 7,393,042 | B2 | 7/2008 | Alfstad-Seibel et al. | |
| 7,637,060 | B2 | 12/2009 | Starheim et al. | |
| 7,685,970 | B1 | 3/2010 | Rains | |
| 8,171,889 | B2 | 5/2012 | Lindfors et al. | |
| 8,281,969 | B2 | 10/2012 | Schmidlkofer | |
| 8,322,580 | B1 | 12/2012 | Hamilton | |
| 8,322,966 | B2 | 12/2012 | Doskocil | |
| 8,870,243 | B2 | 10/2014 | Elkington et al. | |
| 9,132,762 | B1 | 9/2015 | Heath | |
| 9,206,873 | B2 * | 12/2015 | Kull | F16F 9/0254 |
| 9,702,176 | B2 * | 7/2017 | Janak | E05F 1/105 |
| 10,206,369 | B2 | 2/2019 | Niemela et al. | |
| 10,405,516 | B2 | 9/2019 | Niemela et al. | |
| 11,420,547 | B2 * | 8/2022 | Niemela | A01K 1/0035 |
| 2003/0209206 | A1 * | 11/2003 | Campbell | B60P 3/04 |
| | | | | 119/513 |
| 2003/0209207 | A1 * | 11/2003 | Campbell | B60P 3/04 |
| | | | | 119/513 |
| 2003/0209208 | A1 | 11/2003 | Campbell et al. | |
| 2017/0215373 | A1 | 8/2017 | Ruetenik | |
| 2018/0020634 | A1 * | 1/2018 | Mazzilli | A01K 1/10 |
| | | | | 119/512 |
| 2018/0055001 | A1 * | 3/2018 | Niemela | A01K 1/0035 |

\* cited by examiner

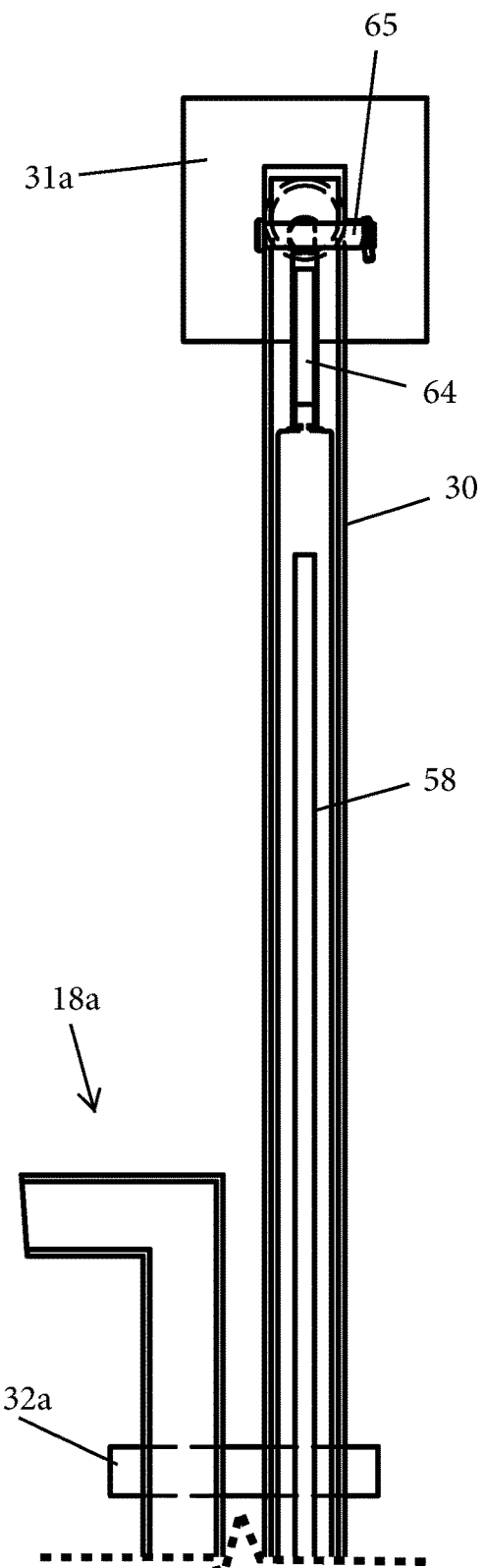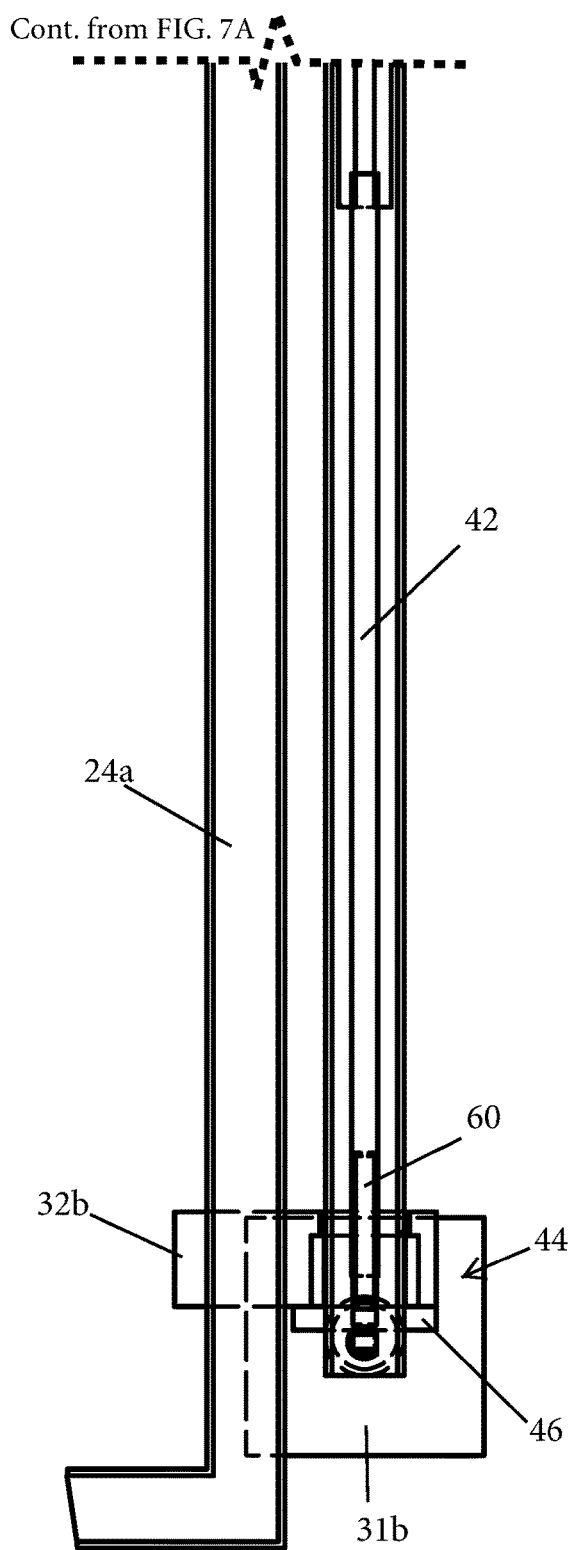
FIG. 7A
FIG. 7B

TRANSPORT TRAILER WITH DEPLOYABLE CORRAL

CROSS REFERENCE TO RELATED APPLICATION

The present application claims priority of U.S. provisional application Ser. No. 62/827,241 filed Apr. 1, 2019, which is hereby incorporated herein by reference in its entirety.

FIELD OF THE INVENTION

The present invention relates to livestock and transport trailers and portable corral fencing.

BACKGROUND OF THE INVENTION

Those who move livestock, goods, or materials over-the-road from one location to another, for reason of work, hobby or show, typically do so using towable trailers especially designed for this purpose. For purposes of discussion, horses as a form of livestock will be referenced throughout the present application because they are a common livestock animal that is carried in over-the-road trailers, such as behind pickup trucks, vans, and other towing vehicles, but it will be appreciated that horses are intended to represent substantially any animal that is transported by trailer and should be provided with more moving space and/or outdoor time each day.

Typical horse trailers have provisions to accommodate one or more horses in a main compartment, as well as saddles, bridles, blankets and other horse-related equipment known generally as "tack". In addition, when horses are being transported over longer distances and for a period of several days, hay, water, and bedding (e.g., wood shavings) are also carried in the trailer or the tow vehicle. Some known horse trailers have a designated roof top area where several bales of hay can be stored.

After a day of travel it is necessary or desirable, for the safety and wellbeing of the horses, to unload them from the confines of the trailer's interior and provide them with an area where they can be free to move about in the open air. Although one option for traveling horse handlers is to identify and rent a horse boarding facility for overnight accommodations, it is not uncommon for a horse handler to carry portable sections of steel fencing, such as in the back of the tow vehicle or strapped to the side of the trailer, in order to construct a temporary makeshift corral or pen. For example, handlers may generally carry a sufficient quantity of fencing to erect their own ten to twelve foot diameter corral at a temporary site along their travel route. The process of loading, unloading, erecting, disassembling, and storing these corral fences is laborious and time consuming, and can be prohibitive for horse handlers of smaller stature or those with certain physical limitations or disabilities. Once at a destination such as a work site, a fair or a showing event where the horses will be temporarily corralled for several days, this difficult process must be repeated to return the livestock to their home quarters.

SUMMARY OF THE INVENTION

The present invention provides, in its various forms, a transport trailer with an integrated and deployable corral that creates a fenced-in space outside the trailer, such as for animals or even for sales personnel to have a walking space. The integrated corral system can be deployed and retracted manually or automatically by means of an onboard hydraulic or electrical power system or the like, which may be powered by a rechargeable battery, a combustion engine, or a tow vehicle electrical or pneumatic system, for example. The transport or livestock trailer with integrated corral system can deploy a corral to at least one side or to a rear of the trailer. Optionally, the deployable corral system provides simplified push-button deployment and retraction, with heavy lifting and stowing handled by the deployment mechanism.

According to one form of the present invention, a deployable corral system for a livestock trailer or other type of transport trailer provides a readily deployable corral along the trailer, and may be integrated into the trailer to provide one or more self-deploying and self-stowing temporary corrals, such as for overnight or short term use during travel with horses or other livestock. The deployable corral system includes extendable corral rails coupled to the trailer and corral cross rails coupled to the extendable corral rails. When the extendable corral rails are extended, the cross-rails are spaced from an exterior side of the trailer, and when the extendable corral rails are retracted the cross-rails are positioned near an upright wall of the trailer. Optionally, a powered drive system moves the extendable corral rails between the extended and retracted positions in response to a command received from a user, such as via a pushbutton controller. Optionally, the drive system is powered by motors driving linear or rotary actuators.

In one aspect, the deployable corral system includes a first and a second pivotally extendable corral rail unit, wherein a proximal end portion of each extendable corral rail unit is pivotally coupled to a region of the upright wall of the trailer, wherein the first extendable corral rail is proximate the forward end of the trailer and the second extendable corral rails is proximate the rearward end of the trailer. The pivots define a substantially vertical pivot axis of the extendable corral rails, which axis is oriented substantially perpendicular to a lower edge of the upright wall of the trailer.

In one aspect, proximal end portions of each extendable corral rail are slidably coupled to a vertical support disposed on the trailer. The support defines a substantially vertical path of movement of the extendable corral rails, which vertical path of movement is oriented perpendicular to the lower edge of the upright wall and parallel to the plane of the upright wall of the trailer. A pair of pivotable hinges are disposed between a vertical corner post disposed on the proximal end of the extendable corral rail and the vertical support such that the extendable corral rail is pivotable about the vertical support while the extendable corral rail is also vertically slideable about the vertical support. Optionally, the deployable corral system includes securing latches disposed with the extendable corral rails to secure the extendable corral rails from being raised while in a lowered and deployed configuration.

In one aspect, a deployment assist mechanism is disposed in the vertical support such that a user can manually deploy the deployable corral system with little physical effort as the deployment assist mechanism supports a majority of the weight of one of the extendable corral rails and associated corral cross-rail.

In one aspect, the deployment assist mechanism includes a vertically slideable support plate disposed on the vertical support slideably and pivotally supports a lower one of the pair of pivotable hinges. Optionally, the deployment assist mechanism includes a gas assisted spring.

In another aspect, distal end portions of the extendable corral rails are telescopically extendable and retractable relative to the respective proximal end portions. Optionally, a corral rail extension system is provided for extending and retracting the distal end portions of the extendable corral rails relative to the proximal end portions thereof. Optionally, the corral rail extension system is part of the deployable corral system's drive system.

In still another aspect, the corral cross-rail is pivotably coupled to the extendable corral rail, and the corral cross-rail is pivotable between a retracted configuration in which the corral cross-rail is substantially parallel to the extendable corral rail, and an extended configuration in which the corral cross-rail is set at a selectable angle relative to the extendable corral rail.

According to another aspect, a support leg is telescopically coupled to a lower end portion of a vertical rail disposed at a distal end of the extendable corral rail. The support legs telescopically extend downward when the extendable corral rails are in their extended positions, and the support legs extend upwardly when the extendable corral rails are in their retracted positions. The support legs include multiple adjustment apertures or holes for vertical adjustment and a lock pin that locks the support leg at a desired height by passing through an aperture or hole in the vertical rail and the adjustment holes. In one aspect, the support legs include a hammer tab or plate such that a user can hammer or press the support legs into the ground surface to secure the corral rails from lateral movement. Optionally, a support leg is telescopically coupled to a lower end of a vertical rail disposed at a distal end portion of each of the corral cross-rails.

According to another form of the present invention, a transport trailer with deployable corral system includes a plurality of upright walls and a pair of wheels supporting them, a pair of extendable corral rails, and a corral cross-rail pivotally coupled to a distal end of each extendable corral rail. The extendable corral rails each have respective proximal end portions coupled to one of the upright walls, and distal end portions spaced from the proximal end portions. When the extendable corral rails are in the extended position, the corral cross-rails is spaced horizontally away from the upright wall, and when the extendable corral rails are retracted the corral cross-rails are positioned at a portion of the upright wall. The extendable corral rails and the corral cross-rails, in the extended position, cooperate with the upright wall to define a corral area. Optionally, the transport trailer includes a drive system for moving the extendable corral rails between extended and retracted positions.

In one aspect, a feed or water trough is pivotably coupled to the upright wall, so that the trough is selectively extendable into the corral area and retractable into the upright wall.

Optionally, the upright wall where the extendable corral rails are mounted includes at least one recess for receiving at least portions of respective ones of the extendable corral rails in their retracted positions.

In still another aspect, a roof panel is positioned atop the upright walls, and a retractable awning system is provided, the awning system a flexible awning sheet, an end support rod, and a pair of awning support arms. The awning sheet has a proximal edge configured for attachment to the roof panel or to the upright wall, and a distal edge that is extendable outwardly from the roof panel and/or the upright wall. The end support rod is attached to the distal edge of the flexible awning sheet, and the awning support arms have upper end portions coupled to the end support rod, with lower end portions pivotably coupled to respective extendable corral rails or to the upright wall.

In another aspect, the trailer interior defines a livestock manger including at least one stall defined by a trailer floor surface, a chest wall set at an oblique angle relative to one of the upright walls, and an interior sidewall extending rearwardly away from the chest wall, with the interior sidewall set at another oblique angle relative to the trailer sidewall. Optionally, the interior sidewall is generally perpendicular to the chest wall, which cooperates with the trailer sidewall to define a storage space accessible from outside the trailer or from inside the interior livestock manger.

In another form of the present invention, a lift support mechanism is provided for assisting in deploying a deployable corral rail. The lift support mechanism includes a hollow rail defining a body of the lift support mechanism. The hollow rail may be coupled to a vertical structure, such as an upright wall of a trailer or the wall of a barn. A reciprocating linear biasing element is disposed inside of the hollow rail with an axis of linear movement that is parallel to a longitudinal axis of the hollow rail. The linear biasing element provides a balancing or offsetting force acting against the weight of the deployable corral. A support plate is movably disposed around an exterior of the hollow rail such that the support plate is longitudinally movable along a portion of the hollow rail. The hollow rail includes a slot extending longitudinally along a portion of the hollow rail, wherein the slot is defined by a gap in a portion of the hollow rail. A guide member is coupled between the linear biasing element and the support plate through the slot. The guide member is configured to move within the slot such that as the linear biasing element moves inside of the hollow rail, the guide member, and thereby the support plate, move along with the linear biasing element. Preferably, the support plate and the reciprocating linear mechanical force element cooperate to vertically support substantially all of the weight of the deployable corral rail. The reciprocating linear biasing element may include a spring, a hydraulic cylinder, or a pneumatic cylinder, for example.

In one aspect, the deployable corral rail is pivotably coupled to the lift support mechanism such that the deployable corral rail is pivotable about the longitudinal axis of the hollow body of the lift support mechanism.

In another aspect, the lift support mechanism further includes an upper hinge disposed between an upper portion of the deployable corral rail and the hollow body of the lift support mechanism, and a lower hinge disposed between a lower portion of the deployable corral rail and the hollow body of the lift support mechanism. The upper hinge and the lower hinge cooperate to provide a pivot axis about which the deployable corral rail is pivotable relative to the hollow body. The upper hinge and the lower hinge are both movably disposed around an exterior of the hollow rail, such that the hinges may move up and down relative to the hollow rail.

In yet another aspect, the lower hinge is movably supported by the support plate, such that if the support plate moves upward along the hollow body the lower hinge is forced upward by the support plate, and if the support plate moves downward along the hollow body the lower hinge is permitted to move downward.

Therefore, the deployable corral system of the present invention allows users to easily provide a corral or enclosed area along the exterior of a vehicle such as a transport trailer, such as a livestock trailer, a commercial display or vendor trailer, or the like. The corral system can be actuated between extended and retracted configurations using a drive system, such as a powered drive system that requires little more than pushbutton or remote actuation by an operator.

When the corral system is integrated into a trailer, a motor vehicle, or other vehicle, its various components can be recessed into channels in their stowed configurations in order to avoid altering the vehicle's length or width.

These and other objects, advantages, purposes, and features of the present invention will become more apparent upon review of the following specification in conjunction with the drawings.

BRIEF DESCRIPTION OF THE DRAWINGS

FIG. 7A is a cross-sectional view of an upper portion of the assisted vertical support of FIG. 6;

FIG. 7B is a cross-sectional view of a lower portion of the assisted vertical support as continued from FIG. 7A;

DETAILED DESCRIPTION OF THE PREFERRED EMBODIMENTS

Figure 1:
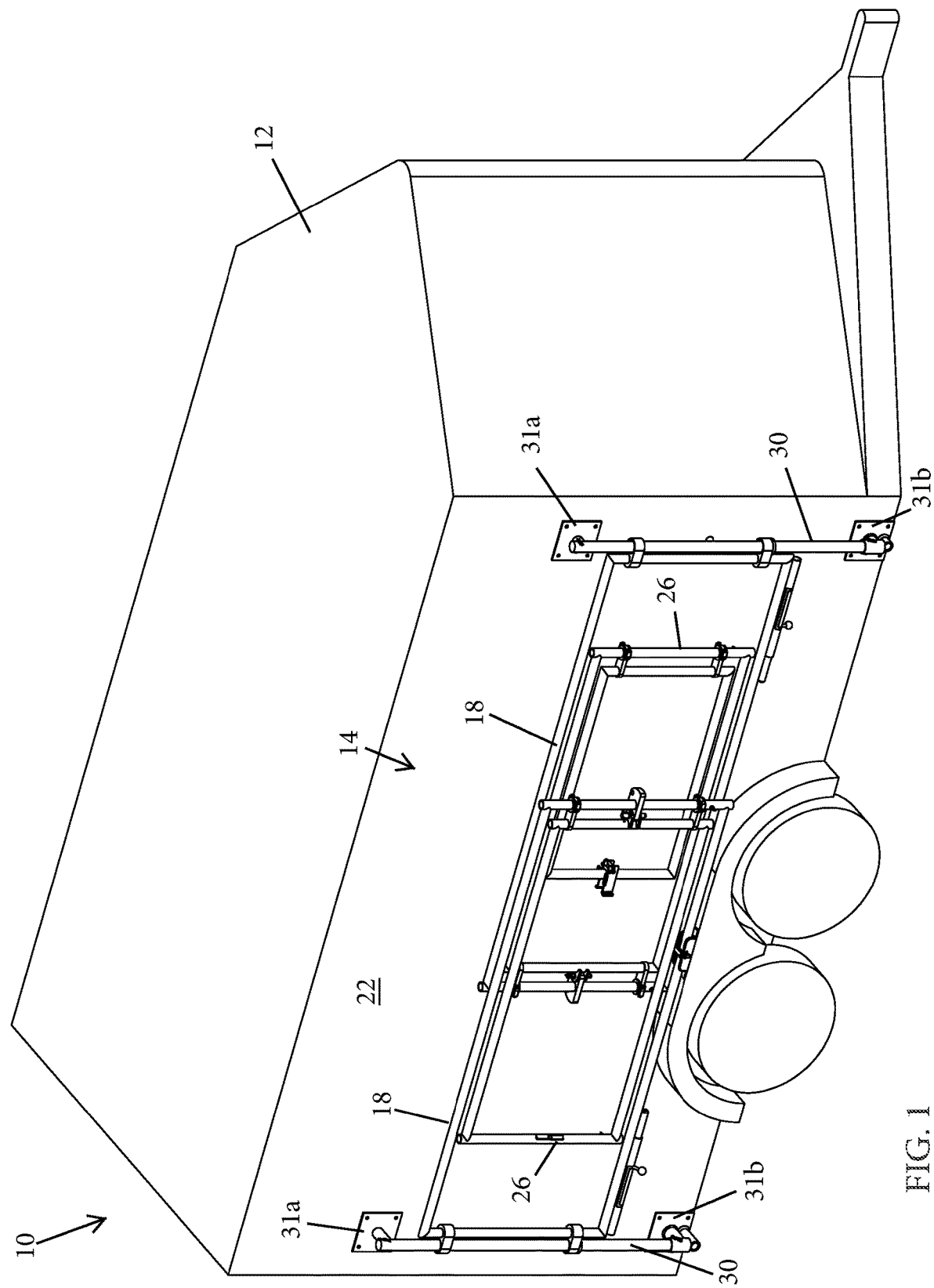
FIG. 1 is a right-front perspective view of a transport trailer with deployable corral in accordance with the present invention, shown in a travel-ready configuration.

Referring now to the drawings and the illustrative embodiments depicted therein, a transport trailer with integrated corral system 10 includes a transport trailer 12, such as a livestock trailer, and a deployable corral 14 that extends and retracts relative to a side of trailer 12, such as shown in FIGS. 1-3F. In the illustrated embodiment, corral 14 is essentially self-contained and integrated into trailer 12, and is capable of manual deployment and retraction by a single operator or user. Corral 14 deploys to create a fenced-in space 16 outside the trailer 12 for animals to have a walking space while they are not being transported (FIG. 2). Optionally, two corrals 14 may be mounted on opposite sides of the trailer 12 to provide two fenced-in spaces 16 on opposite sides thereof. Thus, the transport trailer with integrated corral system 10 greatly simplifies the setup and takedown of a portable corral that travels with the trailer, and is self-supporting so as to reduce or eliminate much of the manual lifting that is usually associated with temporary care of livestock.

Although it is expected that the principles of the present invention would commonly be implemented in the context of livestock trailers, it will be appreciated that other applications are also envisioned, such as for use as portable vendor displays for goods or services, as will be described below. Thus, the term "corral", as used herein, is not to be construed as being limited to livestock containment applications, but instead may refer to substantially any containment or barricade or wall for substantially any purpose. Likewise, it will be understood that references to horses or other livestock herein are for purposes of providing examples of applications and features of the disclosed embodiments, and are not intended to limit the invention to livestock transport and containment applications. In addition, while the various embodiments are described with reference to a towable trailer, it will be appreciated that the principles of the present invention may be adapted to cargo vans, trucks, and self-powered recreational vehicles, and even to stationary structures such as sheds and homes where temporary corrals or pens are desired, without departing from the spirit and scope of the present invention.

Figure 2A:
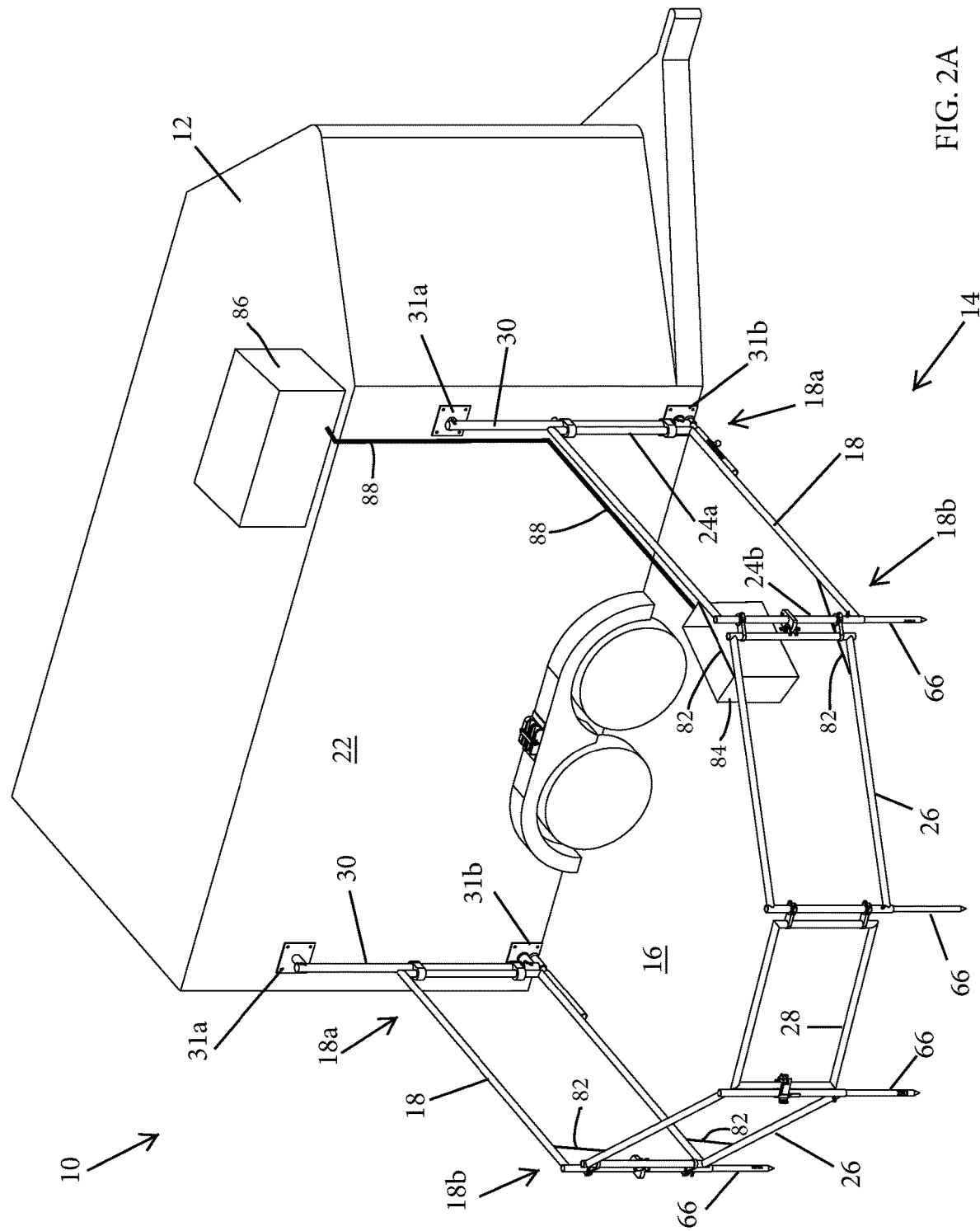
FIGS. 2A-2D are additional right-front perspective views of the transport trailer of FIG. 1, shown with deployable corral in a fully deployed configuration and depicted with various types of containers mounted to the corral.
Figure 2B:
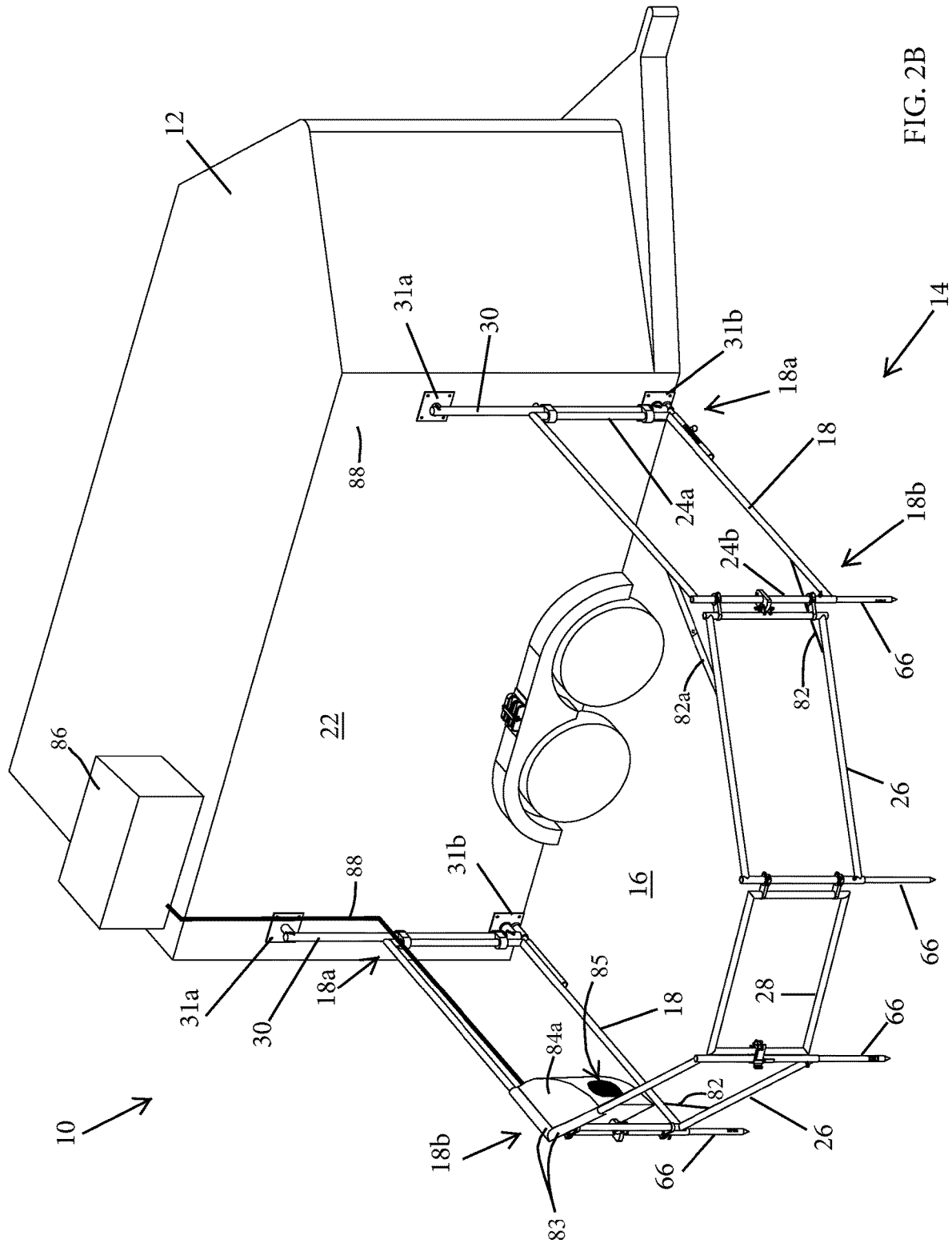
Figure 2C:
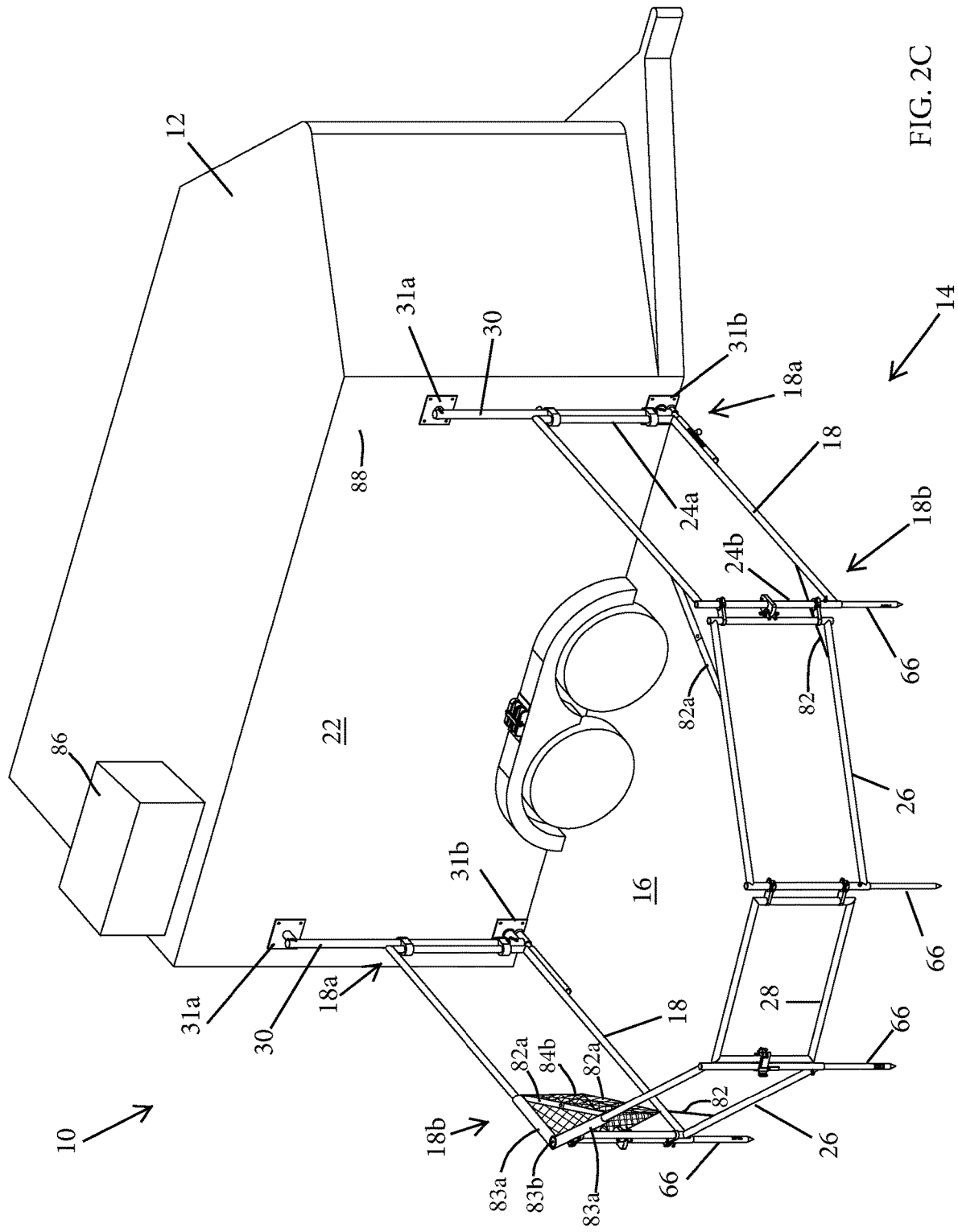
Figure 2D:
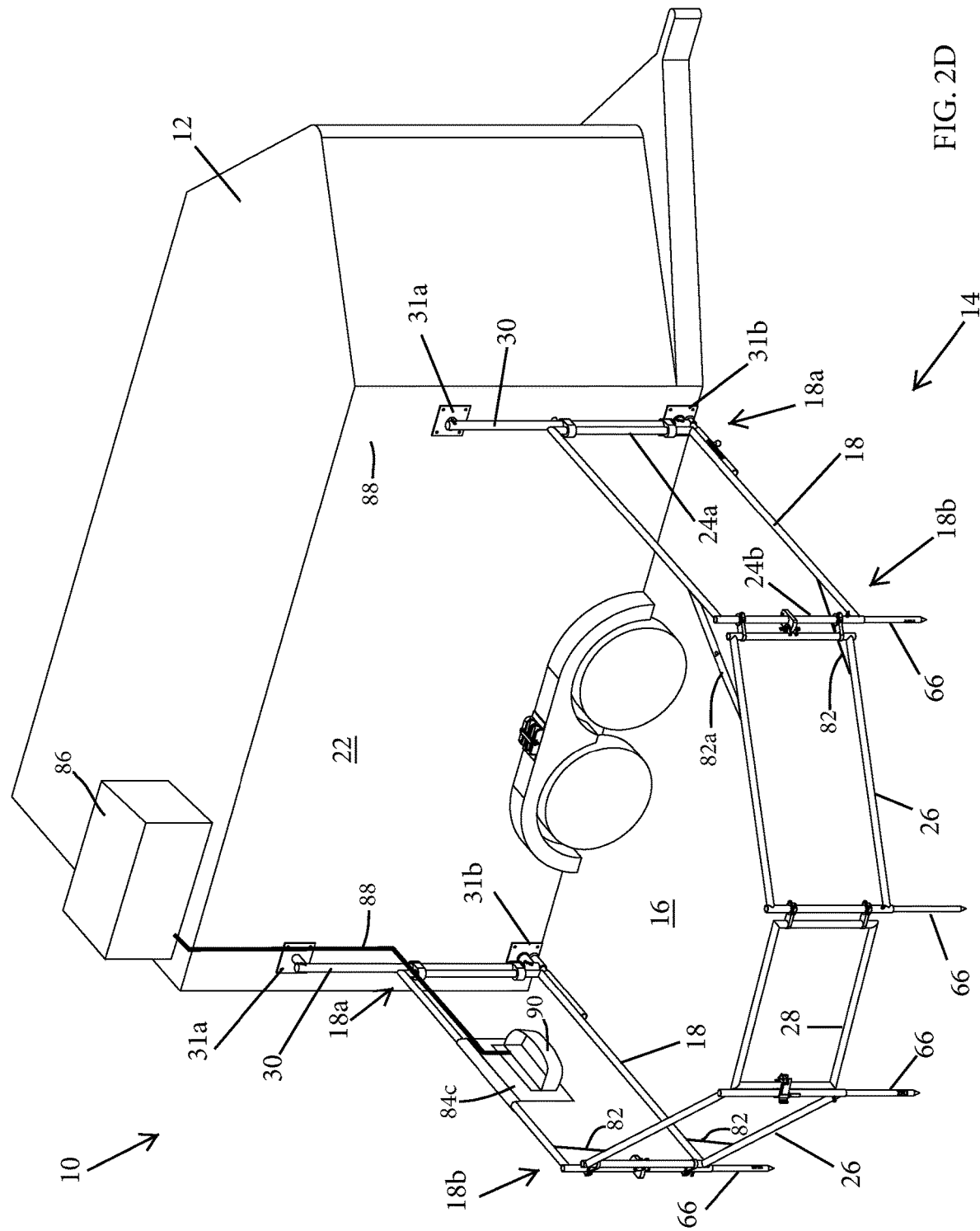
Figure 3A:
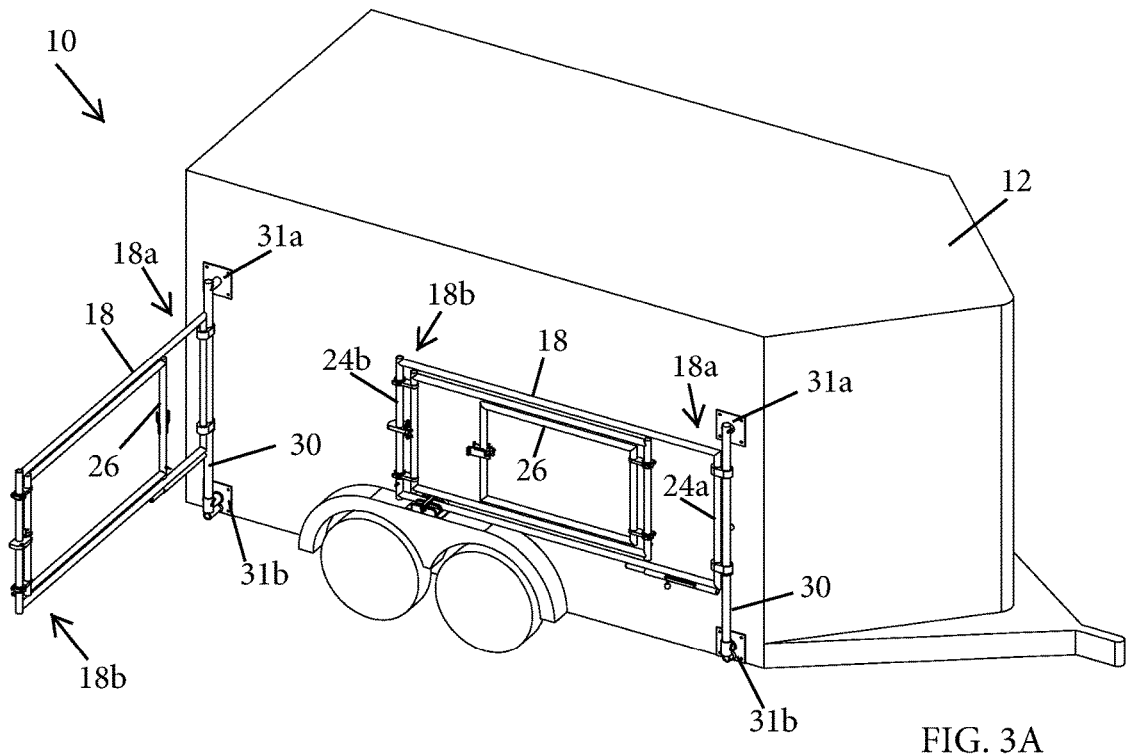
FIGS. 3A-3F are right-front perspective views of the transport trailer with deployable corral of FIG. 1, depicting sequential steps of deploying the deployable corral.
Figure 3B:
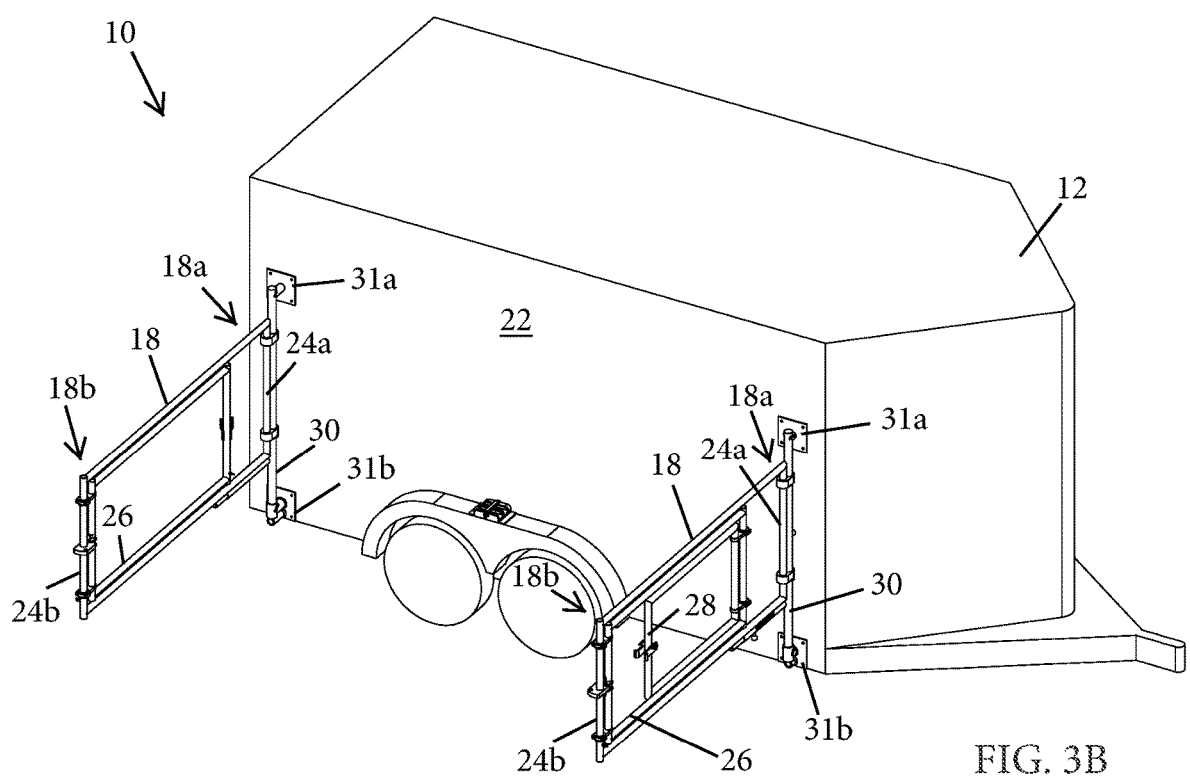
Figure 3C:
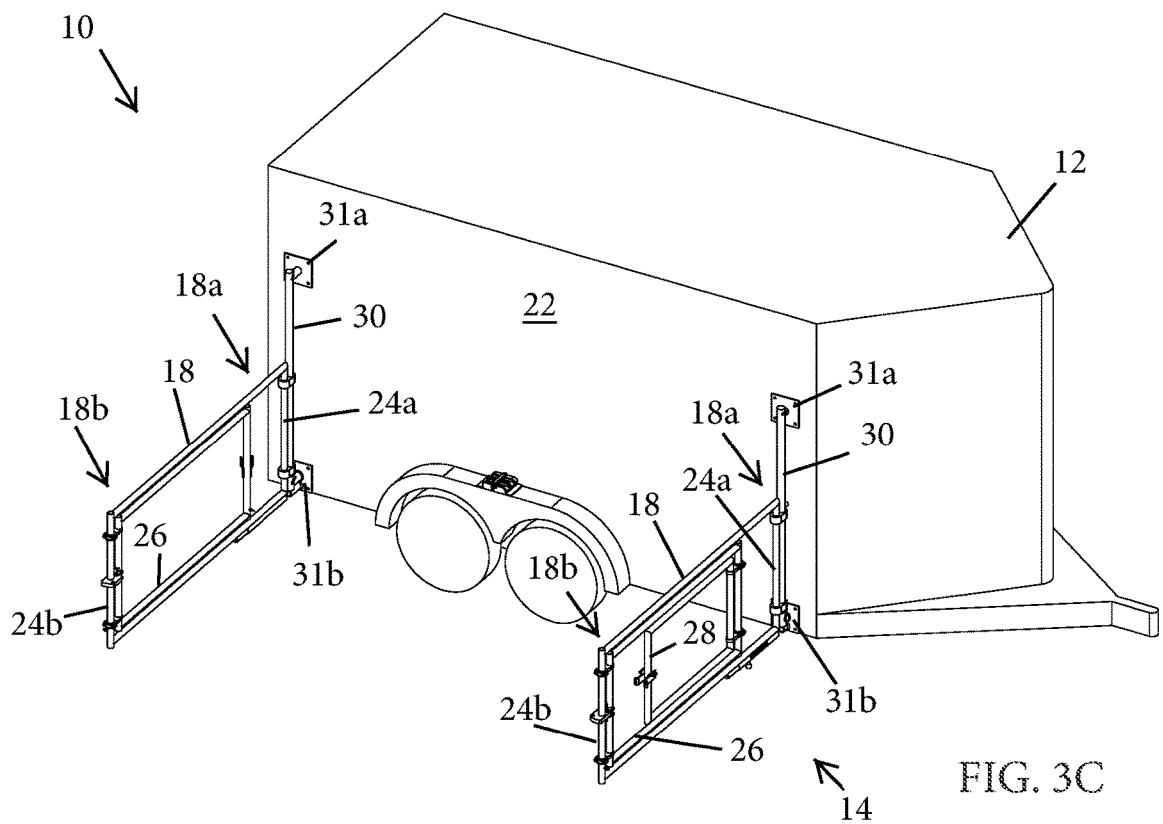
Figure 3D:
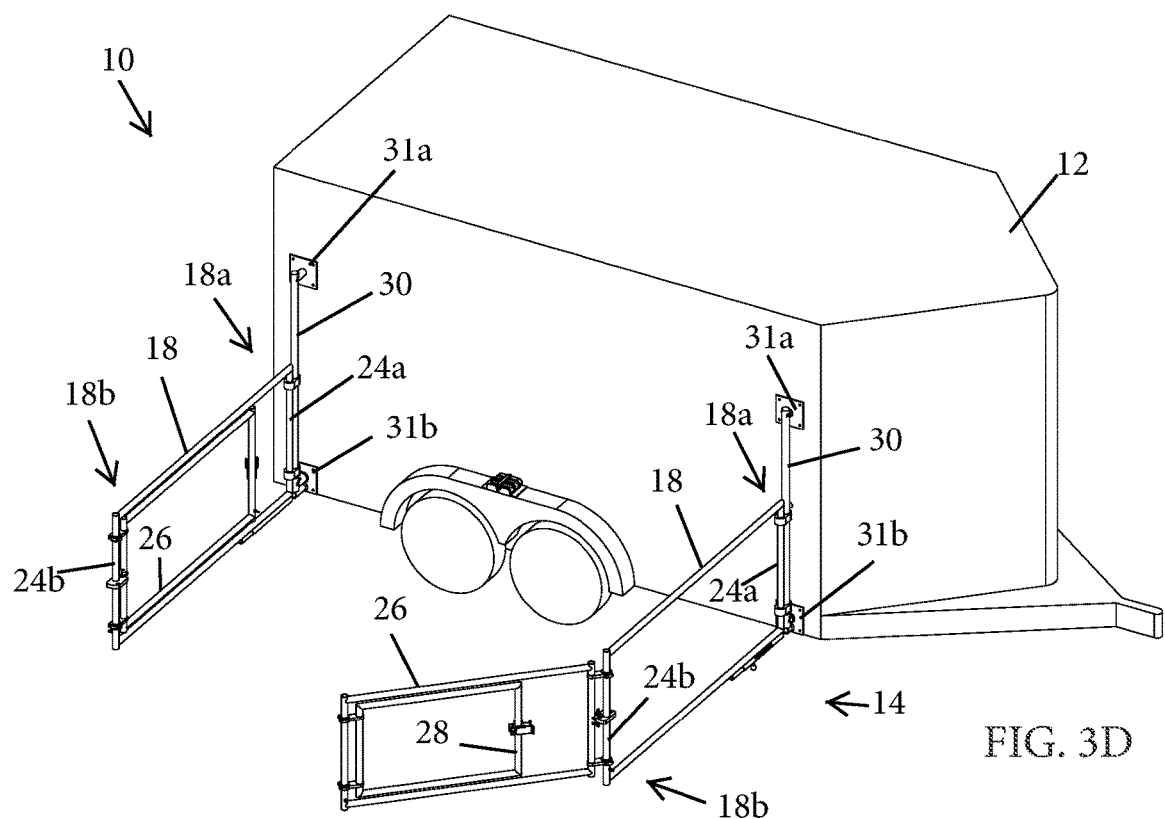
Figure 3E:
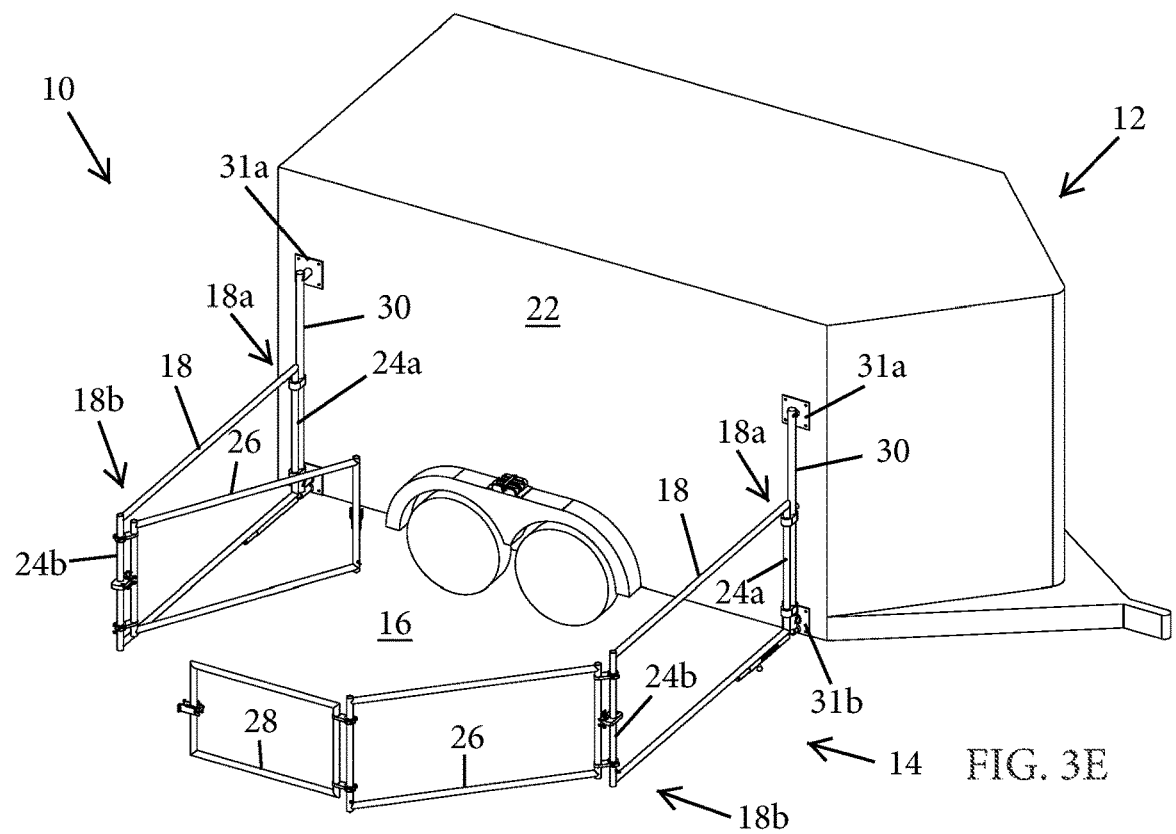
Figure 3F:
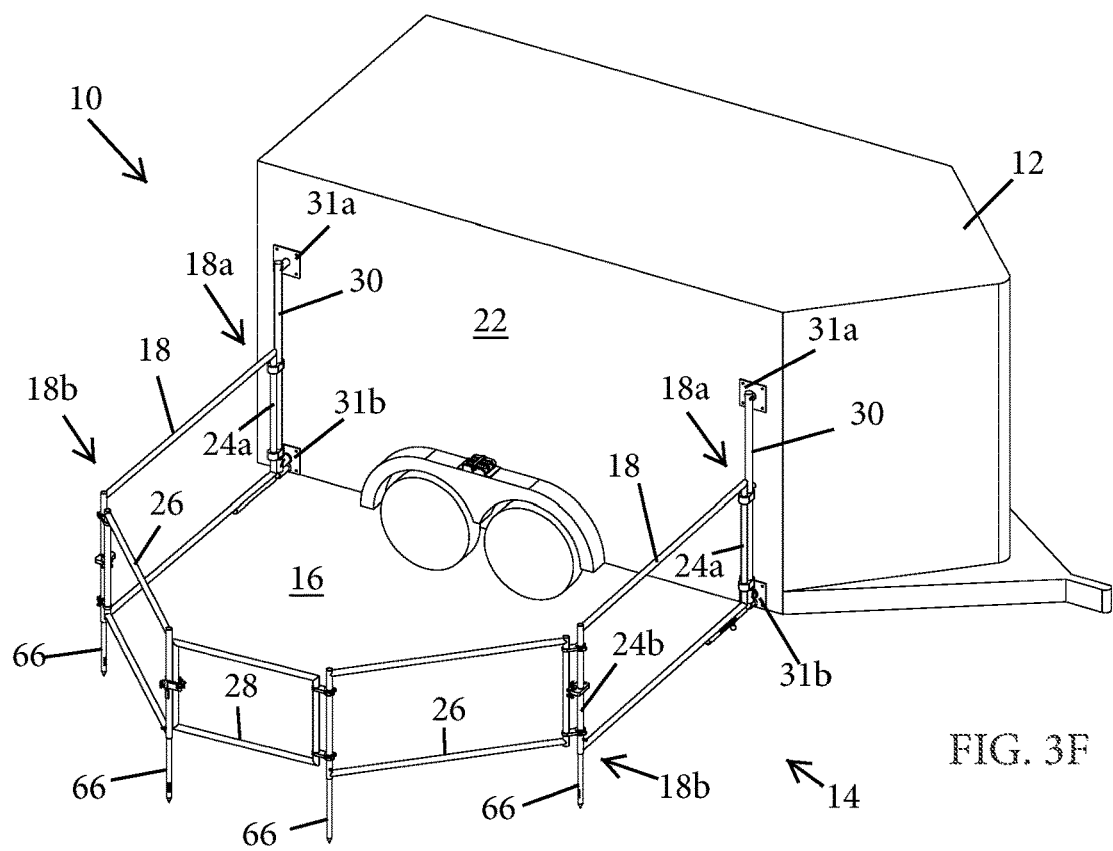

Each deployable corral 14 includes a pair of pivotably extendable corral rails 18 having respective proximal end portions 18a that are pivotably coupled at or along an exterior side panel or upright wall 22 of livestock trailer 12, the rails 18 having distal end portions 18b that extend out from exterior side panels 22 when in the deployed or extended positions of FIGS. 2 and 3F. When corral rails 18 are moved to the stowed or retracted position of FIG. 1, distal end portions 18b are positioned near the exterior side panels 22 of trailer 12. Each of the extendable corral rails 18 has a proximal corner post 24a and a distal corner post 24b extending vertically from its respective proximal and distal end portions 18a and 18b. A corral cross-rail 26 is pivotally coupled to the corner post 24b of each extendable corral rail 18 via hinges, and cooperates with the corral rails 18 and the trailer's side panel 22 to define a fenced-in corral space 16 when the corral 14 is deployed. The corral cross-rails 26 are dimensioned with a shorter overall vertical profile (distance between top and bottom rails of the overall corral cross-rail 26) so as to fit between the top and bottom rails of the corresponding overall corral rail 18 when the corral cross-rails 26 are stowed alongside the trailer side panel 22 such as shown in FIGS. 1 and 3A.

In the illustrated embodiment, a corral swing gate 28 is pivotally coupled to either one of the cross-rails 26, and provides access to corral space 16 when swing gate 28 is opened. It will be appreciated that each cross-rail 26 may be fitted with its own respective swing gate 28, such that a dual swing gate is formed. The rearward corral cross-rail 26 supports pivotable swing gate 28 when the swing gate is closed as shown in FIGS. 2 and 3F, such that the swing gate 28 is operable to be unlatched from the rearward corral cross-rail and swung inwardly or outwardly to provide access to fenced-in area 16. Optionally, the swing gate 28 may be lockable to help secure livestock in the fenced-in area 16.

Extendable corral rails 18 are pivotably coupled to trailer 12 at respective support rails 30 located at corners of trailer 12 near where exterior side panels 22 terminate (FIGS. 1-3F and 4A-4B). The support rails 30 are coupled to the trailer 12 at a upper mounting plate 31a and a lower mounting plate 31b. Optionally, the support rails 30 are removable from the mounting plates 31a, 31b and/or the mounting plates 31a, 31b are removable from the trailer side panels 22. Each support rail 30 defines a vertical pivot axis and includes a slide guide located proximate to a respective vertical edge of the exterior side panel 22, as will be described in more detail below. When corral rails 18 are moved to the stowed or retracted position of FIG. 1, distal end portions 18b are positioned near a center portion of the exterior side panels 22. Optionally, corral rails 18 are two-piece units including an inboard rail portion that would form at least a part of the proximal end portion 18a, and an outboard rail portion that would form the distal end portion 18b, with the outboard rail portion being longitudinally extendable and retractable relative to inboard rail portion, such as in a telescopic manner.

Figure 4B:
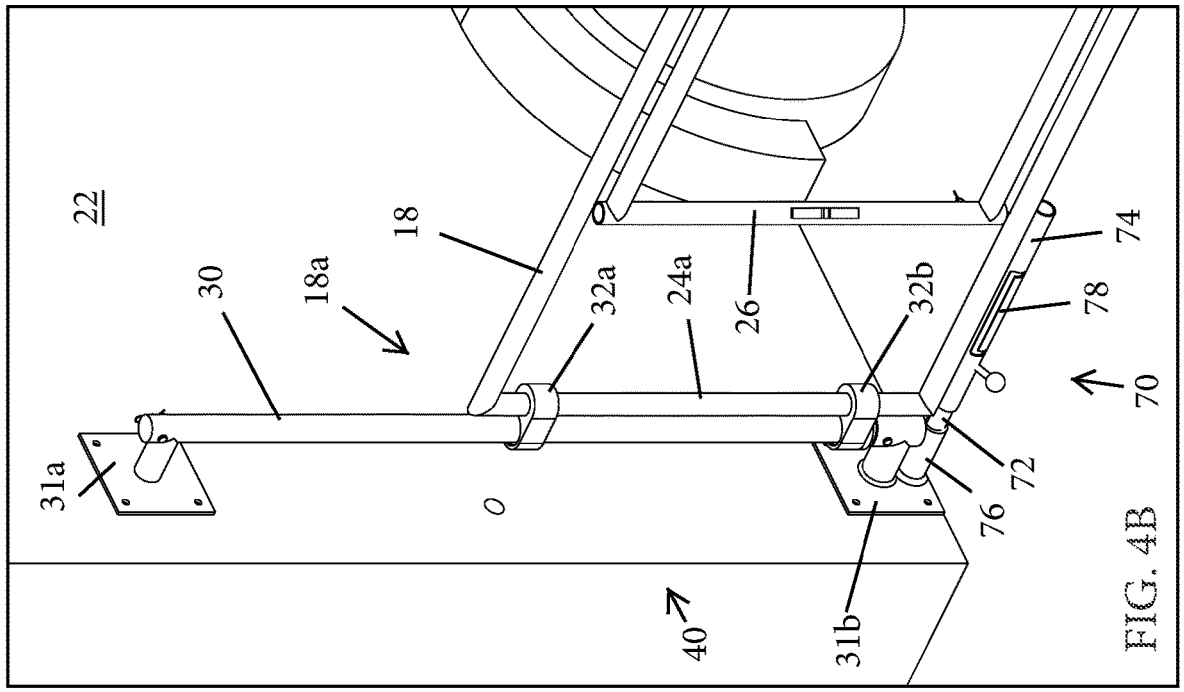
FIGS. 4A and 4B are enlarged left-rear perspective views of an extendable rail and a vertical support rail of the deployable corral of FIG. 1, depicting sequential steps of lowering the extendable rail relative to the vertical support.
Figure 4A:
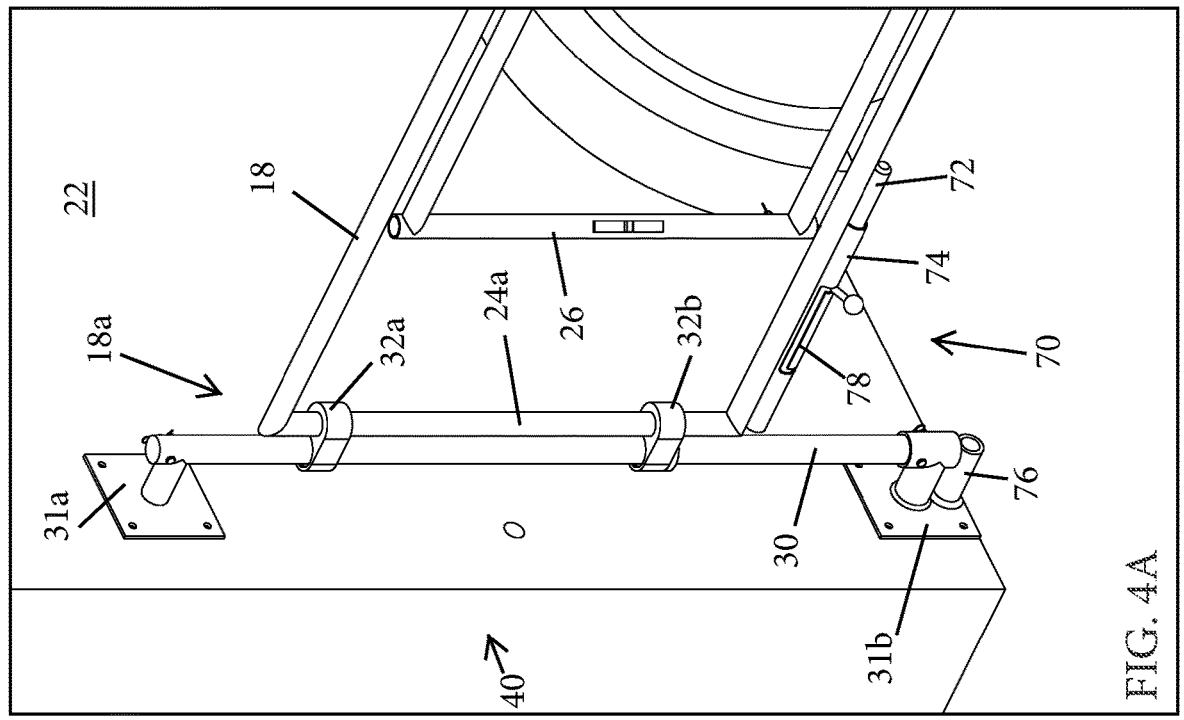

Support rails 30 pivotally support extendable corral rails 18 at the proximal end portion 18a of each extendable corral rail 18. The extendable corral rail 18 is slidably coupled to the vertical support rail 30 disposed on the trailer 12. The support rail 30 defines a substantially vertical path of movement of the extendable corral rail 18, such that the proximal end 18a is operable to slide vertically along the vertical support rail 30, thus providing vertical movement of the extendable corral rail 18 relative to a ground or support surface. As illustrated in FIGS. 4A-4B, a pair of pivotable hinges 32a, 32b couple the proximal corner post 24a of the extendable corral rail 18 to the vertical support rail 30 such that the extendable corral rail 18 is pivotable about the vertical support rail 30 while the extendable corral rail 18 is also vertically slideable about the vertical support rail 30. The pivotable hinges 32 include an upper hinge 32a and a lower hinge 32b, spaced vertically about the proximal corner post 24a of the extendable corral rail 18 such that the pivotable hinges 32a, 32b coordinate to substantially support the weight of the corral system 14 and additional forces acting on the corral system 14 during varying stages of deployment and stowage of the corral system 14.

Figure 11:
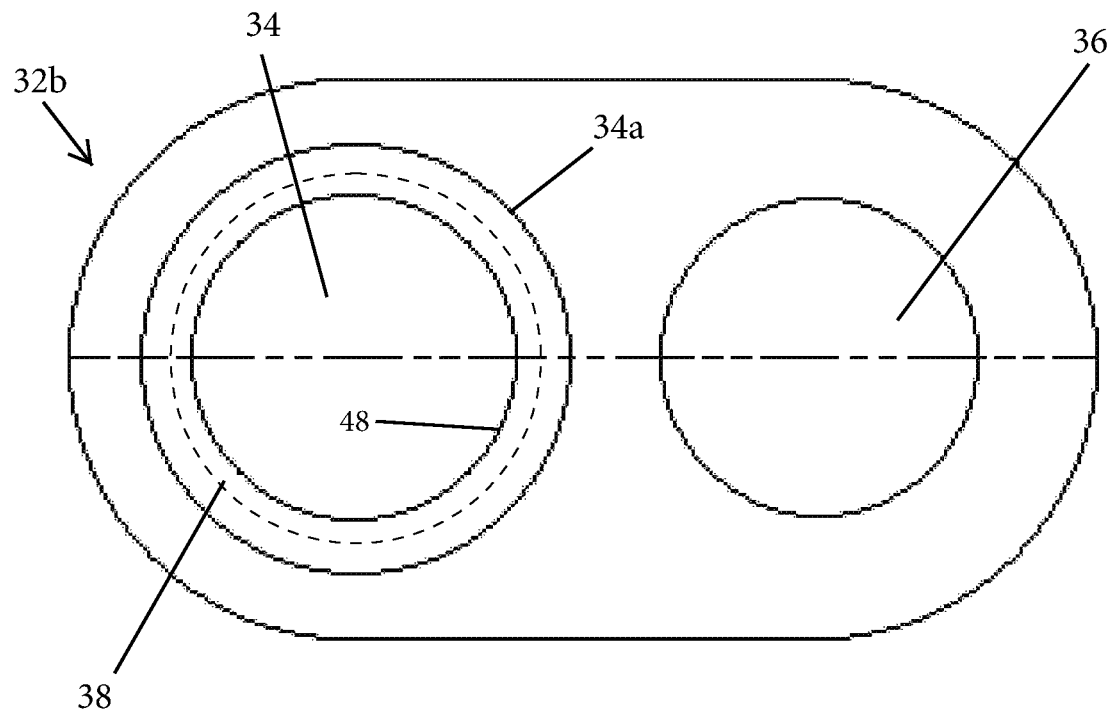
FIG. 11 is a top view of a lower vertically slideable hinge of the assisted vertical support of FIG. 7B.
Figure 12:
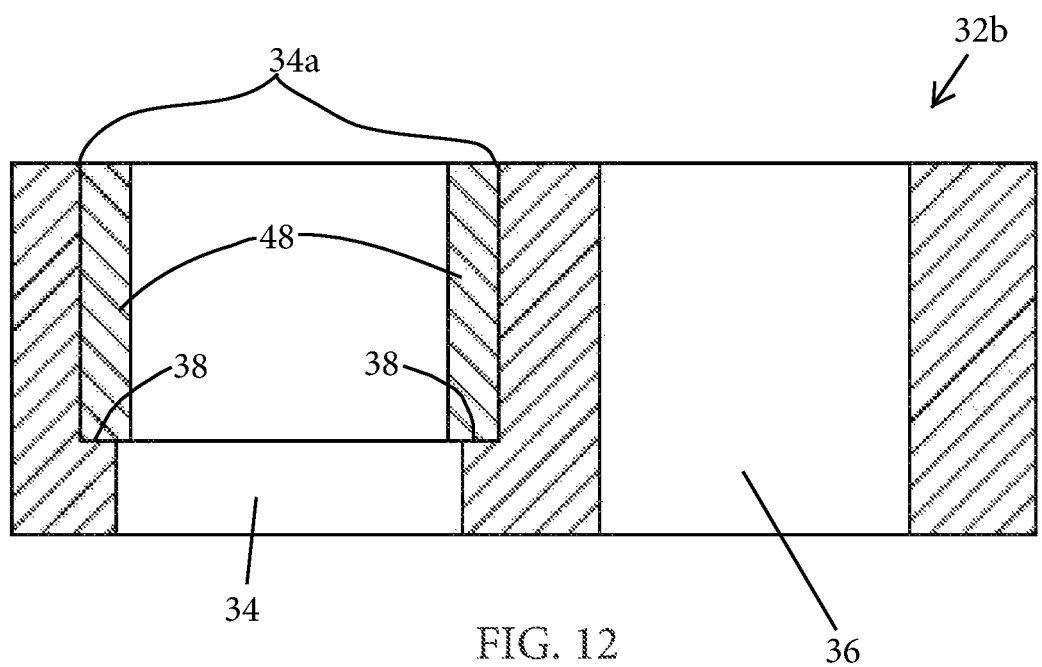
FIG. 12 is a cross-sectional view of the lower vertically slideable hinge of FIG. 11.

As illustrated in FIGS. 11 and 12, each of pivotable hinges 32a and 32b include two circular bores 34, 36 spaced apart laterally and configured to couple via one bore 36 to the proximal corner post 24a of the extendable corral rail 18 and via the other bore 34 to the vertical support rail 30. A support lip 38 is defined inside the circular bore 34 at the terminus of an enlarged-diameter region 34a of the circular bore 34, wherein the enlarged-diameter region 34a is at least somewhat larger than the remaining portion of the bore 34. The enlarged-diameter region 34a receives a spacer 48 that accommodates a portion of a vertically slideable support unit 44, as will be described below. The bottom of the spacer 48 rests on top of the support lip 38. The pivotable hinges 32a and 32b pivot relative to the vertical axis defined by the vertical support rail 30 as well as the vertical axis defined by the proximal corner post 24a of the extendable corral rail 18, with the two pivoting movements occurring either individually or simultaneously. In the illustrated embodiment, the proximal corner post 24a is shorter in length than the vertical support rail 30 such that, based on the spacing of the pivotable hinges 32a and 32b, the pivotable hinges 32a and 32b are operable to slide up or down the vertical support rail 30 to permit raising and lowering the extendable corral rails 18, providing for height adjustment of the deployable corral 14 relative to the ground or support surface.

Figure 6:
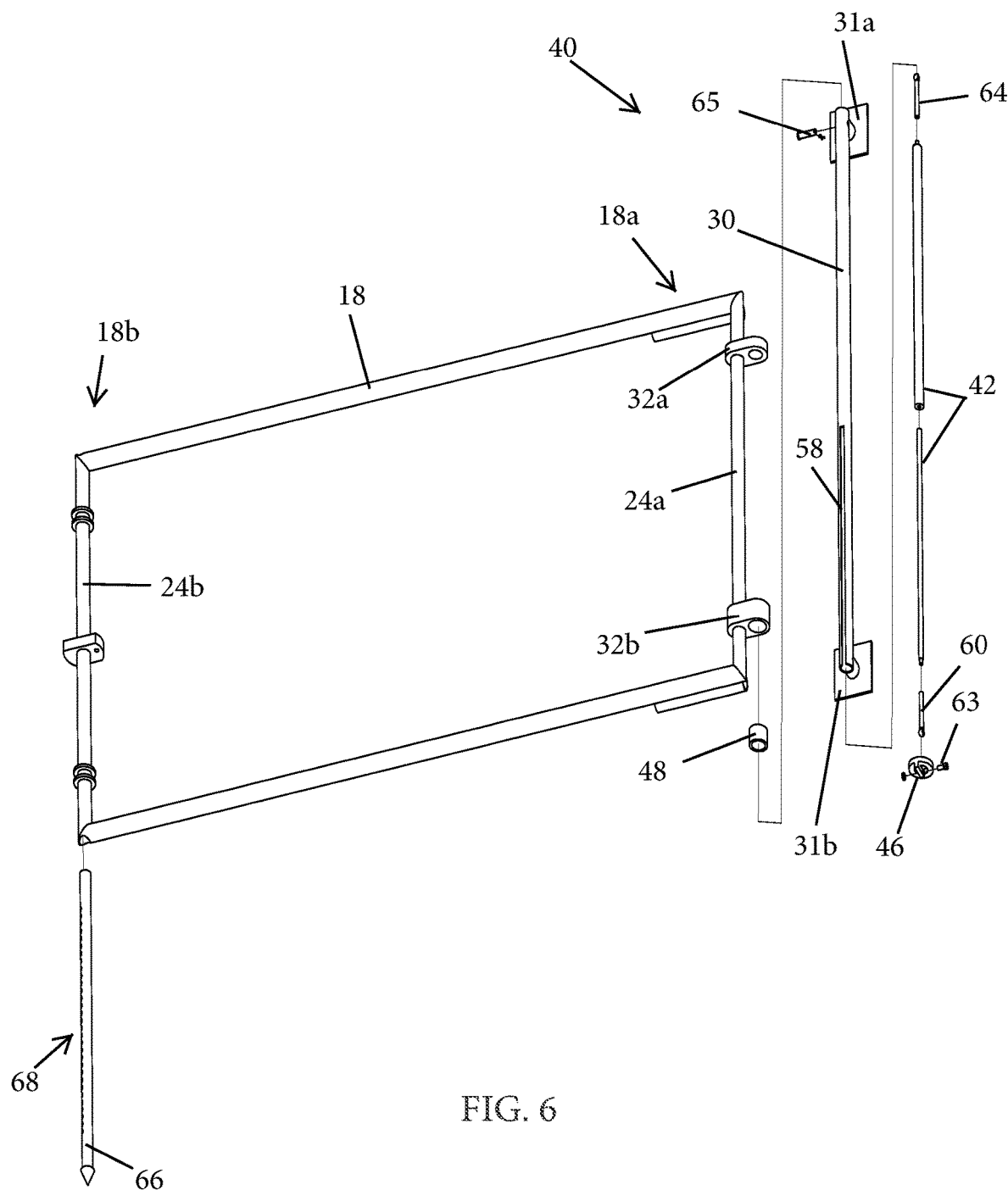
FIG. 6 is an exploded view of the extendable rail of FIG. 5, including an assisted vertical support.
Figure 8:
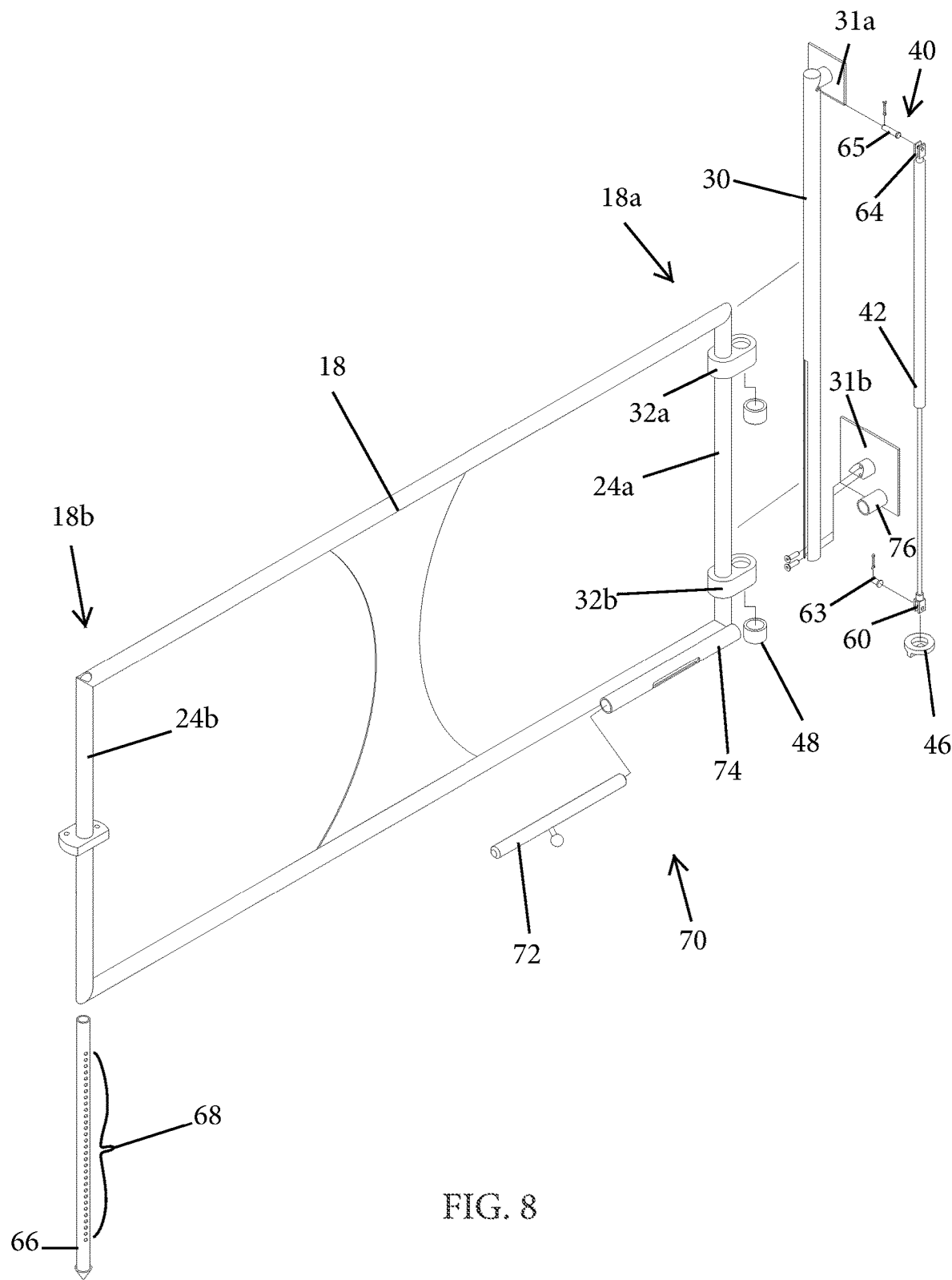
FIG. 8 is an exploded perspective view of another extendable rail compatible with the transport trailer with deployable corral of FIG. 1.

Optionally, and with reference to FIGS. 6-8, a deployment assist mechanism 40 is disposed in the vertical support rail 30 to aid a user in the manual deployment and stowing of the deployable corral system 14 with relatively minimal physical effort. To accomplish this, the deployment assist mechanism 40 supports a majority of the weight of the corresponding extendable corral rails 18 and associated corral cross-rail 26 when not in the fully deployed configuration. The deployment assist mechanism 40 includes a reciprocating linear biasing element 42, such as a spring, a gas-charged strut, a pneumatic cylinder, a hydraulic cylinder, or the like, which provides vertical lift support to substantially balance or offset much of the weight of the deployable corral system 14 while the deployable corral system is raising or lowering.

Figure 10A:
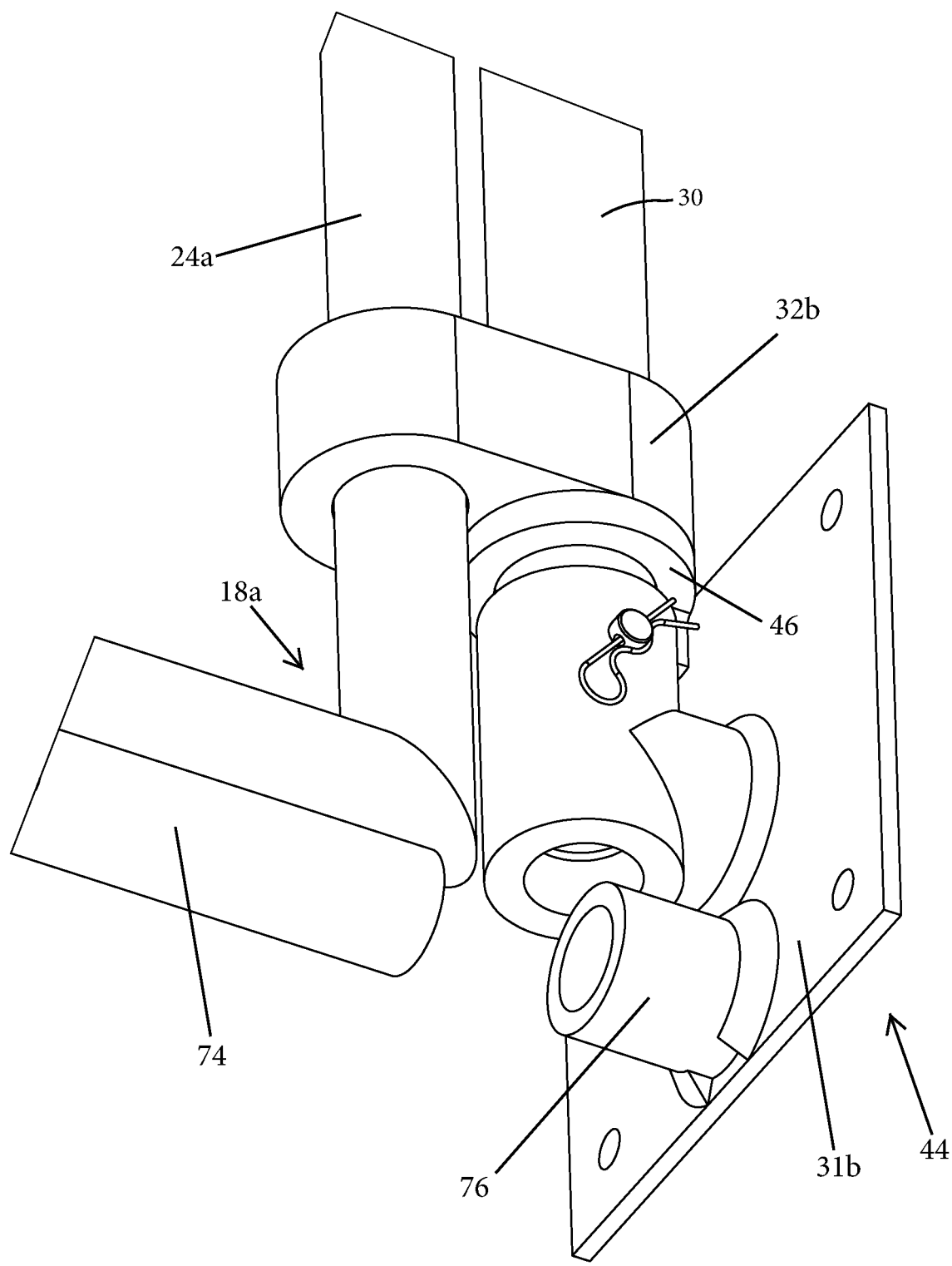
FIG. 10A is an enlarged lower outboard-side perspective view of a vertically slideable pivot system of the deployable corral, including a lower vertically slideable hinge of FIG. 9.
Figure 10B:
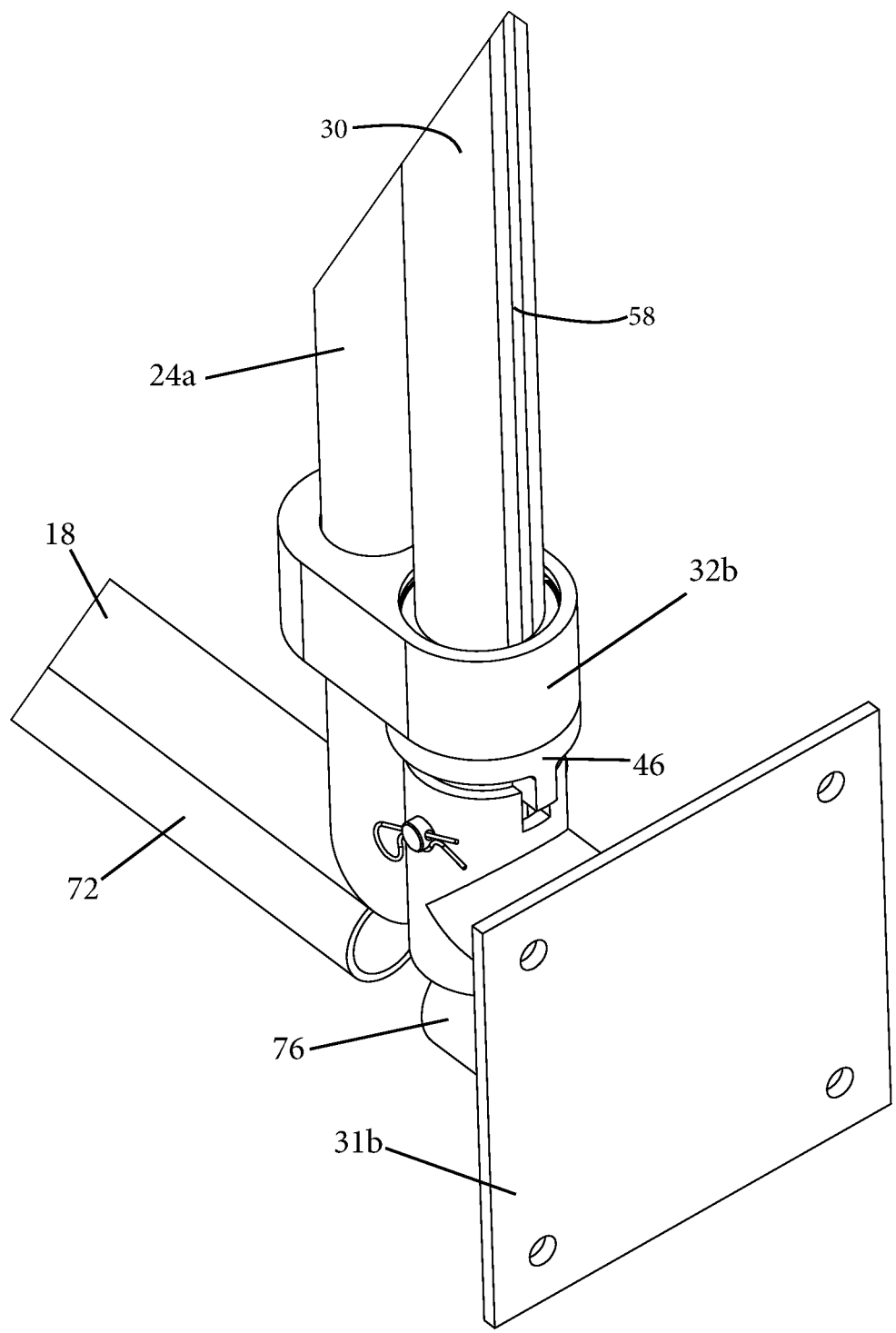
FIG. 10B is an enlarged upper inboard-side perspective view of the vertically slideable pivot system of FIG. 10A.

Referring to FIGS. 10A-10B, the deployment assist mechanism 40 includes a vertically slideable support unit 44 coupled to a lower end of the spring 42, disposed partially within the vertical support rail 30, and configured to slideably and pivotally support the lower pivotable hinge 32b. The lower hinge 32b, while supporting the extendable corral rail 18 and cross rail 26 at the vertical support rail 30, is engaged from below by the support unit 44. In this manner the support unit 44 and the spring 42 cooperate to support at least a portion of the weight of the deployable corral system 14, and allow a user to raise the deployable corral system 14 from a lowered position with minimal physical exertion, or to lower the deployable corral system 14 from a raised position to the lowered position with minimal physical exertion, and without permitting a free drop of the corral rail 18 and cross rail 26 if the user loses grip or intentionally releases the rails in the raised position.

Figure 13:
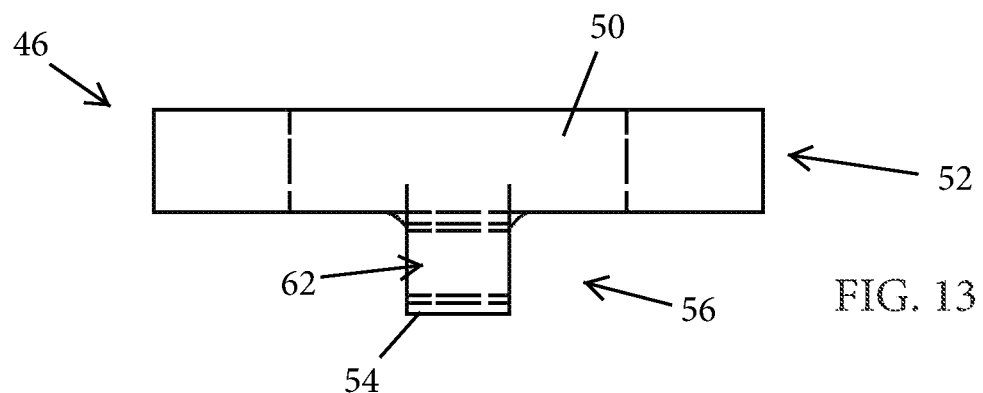
FIG. 13 is an elevation view of a vertically slideable support plate of the assisted vertical support of the transport trailer with deployable corral.
Figure 14:
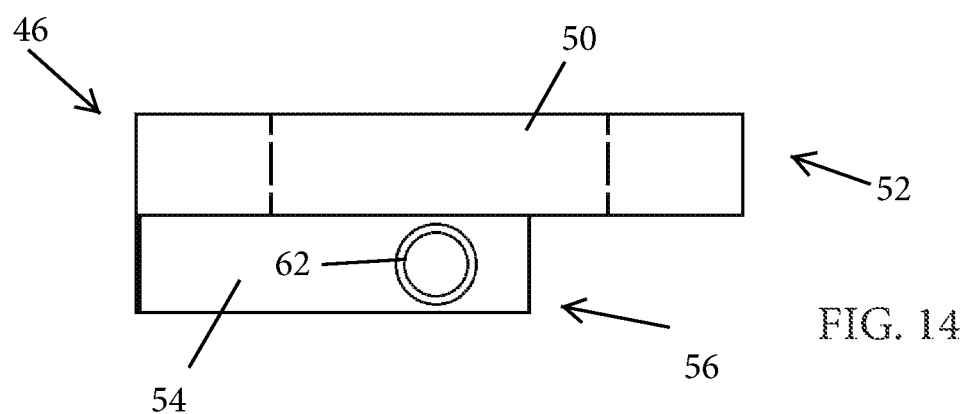
FIG. 14 is another elevation view of the vertically slideable support plate of FIG. 13.
Figure 15:
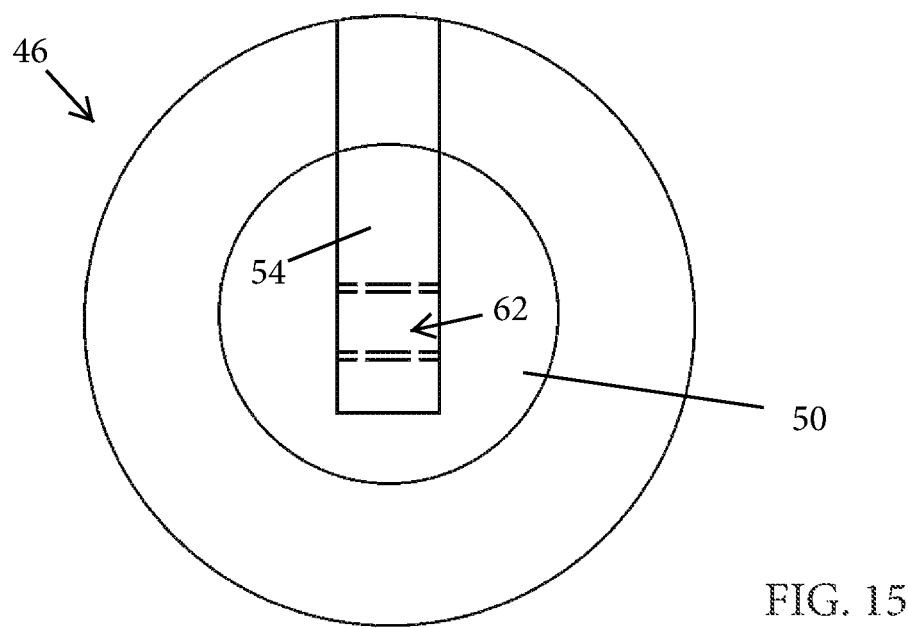
FIG. 15 is a top view of the vertically slideable support plate of FIG. 13.

As illustrated in FIGS. 6, 7B-10B and 13-15, the vertically slidable support unit 44 includes a slideable support plate 46 and the spacer 48. Spacer 48 fits around the vertical support rail 30 and inside bore 34a defined in pivotable hinge 32b such that the spacer 48 is freely slideable and pivotable about vertical support rail 30 while providing a stand-off or bearing between the support 46 and the vertical support rail 30 and pivotable hinge 32b. Support plate 46 communicates the linear mechanical force provided by the spring 42 to the lower hinge 32b and thereby to the extendable corral rail 18 of the deployable corral system 14. As illustrated in FIGS. 13-15, the support plate 46 includes a hole 50 disposed through the center of an upper portion 52 of support plate 46 having a diameter larger than the outer diameter of the vertical support rail 30 and allowing the support plate 46 to freely slide up and down the vertical support rail 30.

As best shown in FIGS. 10B and 13-15, a slide guide or tab 54 is provided on a lower portion 56 of the support plate 46 and configured to track within a notch, slot, or opening 58 defined by a gap in a portion of the vertical support rail 30 (FIGS. 5-7B and 10B). Upper portion 52 and lower portion 56 of the support plate 46 are fixedly coupled to one another, such as mechanically fastened, welded, cast, machined from a single piece of material, or a similar form of fixation. Slide guide 54 includes a connection feature 62 (FIGS. 13-15) that couples the support plate 46 to a coupler or clevis 60 disposed on a lower portion of the spring 42, such as shown in FIG. 6. The coupler 60 mates to the slide guide 54 within an area defined by the interior diameter of the vertical support rail 30 such that the connection between coupler 60 and the slide guide 54 is operable to slide freely within the vertical support rail 30. Optionally, an upper coupler or clevis 64 and pin 65 are disposed on an upper portion of the spring 42 to couple the spring 42 to an upper portion of the vertical support rail 30.

As illustrated in FIGS. 13-15, the connection feature 62 is a pin hole, wherein a pin 63 passing through one side of coupler 60, through the pin hole 62, and through the other side of coupler 60, secures the support plate 46 to the coupler 60 of the spring 42. As the support plate 46 slides up or down along the vertical support rail 30, the support plate 46 is restrained from spinning or pivoting around the vertical support rail 30 by the interaction of the slide guide 54 inside the gap 58 of the vertical support guide. However, the hinge 32b remains freely pivotable and slideable about the vertical support rail 30 due to the configuration of the spacer 48, the support plate 46, and the spring 42.

A support leg 66 is slideably coupled to each of the distal end portions 18b of the extendable corral rails 18 where the corral rail 18 meets cross-rail 26, with another support leg 66 at the opposite end of each cross-rail 26 as illustrated in FIGS. 2 and 3F. Preferably, each support leg 66 is telescopically disposed within the corner post 24b of each extendable corral rail 18 and within a corner post at the distal end of each cross rail 26. Each support leg 66 is height-adjustable to accommodate uneven terrain outside the trailer 10. Optionally, each support leg 66 has a support wheel (not shown) rotatably mounted at its distal end, for rolling support of corral rails 18 and cross-rails 26 along the ground or other support surface. Optionally, instead of support wheels, it is envisioned that each support leg 66 may be fitted with a skid plate or the like, which could slide along the ground or support surface during extension and retraction of the corral rails. Optionally, each support leg 66 includes a hammer tab (not shown) to allow a user to hammer or press the support leg 66 into a soft or displaceable ground surface below the support leg to provide lateral support to the corral rails 18 and cross rails 26.

Figure 5:
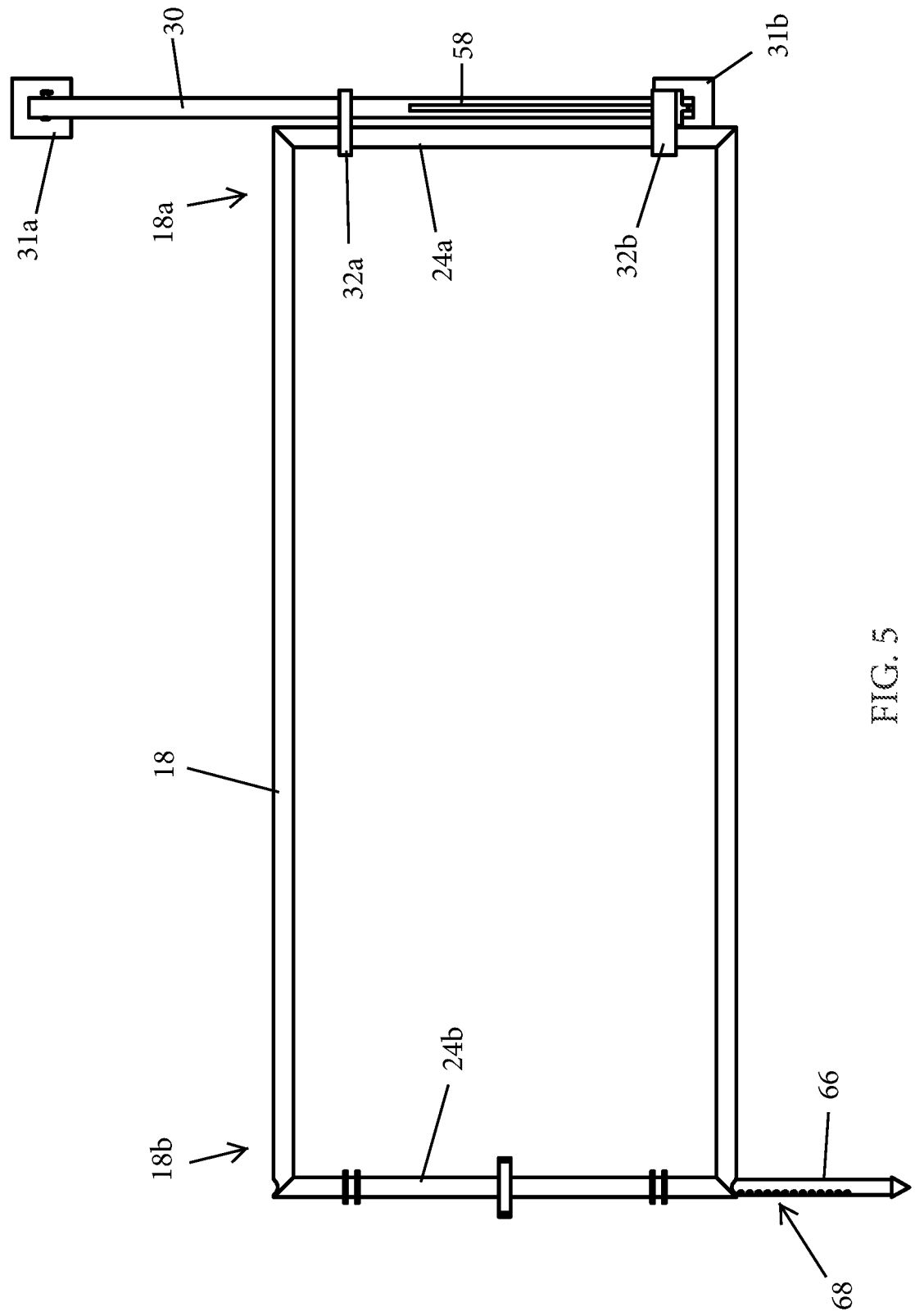
FIG. 5 is an elevation view of an extendable rail of the deployable corral of FIG. 1.

Support legs 66 can be extended downwardly from the corral rails 18 and cross-rails 26 when the corral rails 18 are in the extended position of FIGS. 2 and 3F. Support legs 66 can be retracted upwardly when the corral rails 18 are in the retracted position of FIG. 1 and may be left retracted when the rails 18 are partially extended or partially retracted as shown in portions of FIGS. 3A-3E. It should be understood that the support legs are not illustrated in FIGS. 1 and 3A-3E. Optionally, support legs 66 may be fixed at a desired height via respective pins (not shown) that pass through a portion of the distal end 18b of the extendable corral rail 18 or distal end of the cross-rail 26 into one or more of a plurality of holes 68 disposed along the support leg 66, such that the support leg 66 is constrained from vertical movement when the pin is inserted (FIG. 5). The plurality of holes 68 are evenly spaced and arranged along most of the length of the support leg 66. Optionally, the pin includes a spring-release detent or spring-loaded actuator that secures the pin in the aligned holes until manually released by the user.

Optionally, a powered drive system is provided for extending and retracting the deployable corral 14. The drive system includes a double-acting piston-cylinder operatively coupled to each extendable corral rail 18 and to a proximate region of trailer 12. Referring to FIGS. 3A-3F, in which several steps of corral retraction and raising are depicted, from the deployed or fully retracted position of FIG. 1 to the stowed or fully extended position of FIG. 2, the retraction of extendable corral rails 18 relative to the exterior panel 22, the pivoting of cross-rails 26, and associated components, may be accomplished by operating such a powered drive system. Different powered actuators may be used to effect the different desired movements of deployment and retractions, and sequenced by a controller that received position feedback from sensors as further described below. It will be appreciated that other stowage steps, such as closing the swing gate 28, may be accomplished manually prior to operating piston-cylinder. In addition, various sensors may be provided to ensure that the powered drive system cannot be operated when the swing gate 28 is open, or other features are deployed, to ensure that the corral 14 is ready for retraction before the powered drive system is operated.

The power drive system may be operated by a pushbutton controller or the like, placed anywhere along the trailer that allows or causes the user to stay clear of the moving components while monitoring their operation to ensure that corrals 14 deploy and stow correctly, and without contact with obstructions. For example, a handheld pendant controller may be connected via wire to the powered components (e.g., electric motor or combustion engine, fluid valves, solenoids, etc.) of the drive system, and stowed in a storage area when not in use. It is further envisioned that a wireless remote control may be used to operate the drive system, and/or that a key system may be provided to ensure that only authorized users are able to actuate the system.

In addition, the controller may provide fault or warning messages or other visual or audio indications to the operator in the event that a sensor detects an obstruction or a not-ready indication (e.g., extendable corral rails 18 locked in the deployed positions when corral 14 is to be retracted). Additional functionality may be provided, such as by adding powered actuators to move corral cross rails 26 after extendable corral rails 18 are fully extended, or prior to retraction of the extendable corral rails 18, and automatically sequenced as appropriate so that a single user input can be used to initiate a full extension or retraction sequence. A programmable logic controller (PLC) or the like may be used to facilitate operation and control of the powered drive system as desired.

Although deployable corrals 14 are shown as being mounted and deployable along the side panels 22 of trailer 12, it will be appreciated that a deployable corral may also (or instead) be fitted at a rear of the trailer, with a rear lift gate and ramp being lowerable into the fenced-in corral space created by the rear-mounted deployable corral, without departing from the spirit and scope of the present invention. It will further be appreciated that latches or supports may be provided along the trailer side panels 22 to support and retain the corral rails 18 and cross rails 26 when they are in the stowed or retracted configuration, such as when the trailer is being towed or parked without deploying the corrals. In the stowed or retracted configuration of FIG. 1, the corral rails 18 and cross rails 26 are in a flat configuration and substantially parallel to the respective trailer side panels 22 such that the stowed rails do not extend laterally outwardly from the side panels 22 further than the trailer wheel fenders. Thus, the stowed corral system does not reduce the maneuverability of a typical horse trailer having wheels and wheel fenders that extend laterally outwardly from the trailer's side panels 22.

Other optional features of trailer 12 and deployable corrals 14 include a shade awning (not shown) that is stored in rolled form along an upper edge of each side panel 22, and a retractable feed or water trough (not shown) that extends outwardly from side panel 22 and retracts into the side panel 22 for transport. Shade awning is a flexible sheet supported on a rotatable spring-loaded or motor-driven spool that is mounted near an upper portion of the side panel 22. These components are more fully described in commonly-owned U.S. Pat. No. 10,063,069 and 10,405,516, both of which are hereby incorporated herein by reference in their entireties.

Optionally, the powered drive system includes a powered leadscrew operable to act upon extendable corral rails 18. It will be appreciated that powered leadscrews can eliminate the need for a hydraulic pump and associated motor, instead utilizing a relatively compact drive motor that may be electrically (or hydraulically) energized, a gear train reduction, and a rotatably driven nut or collar (not shown). In another embodiment, an optional single cylinder linkage provides lifting capability for the deployable corral 14.

Figure 9:
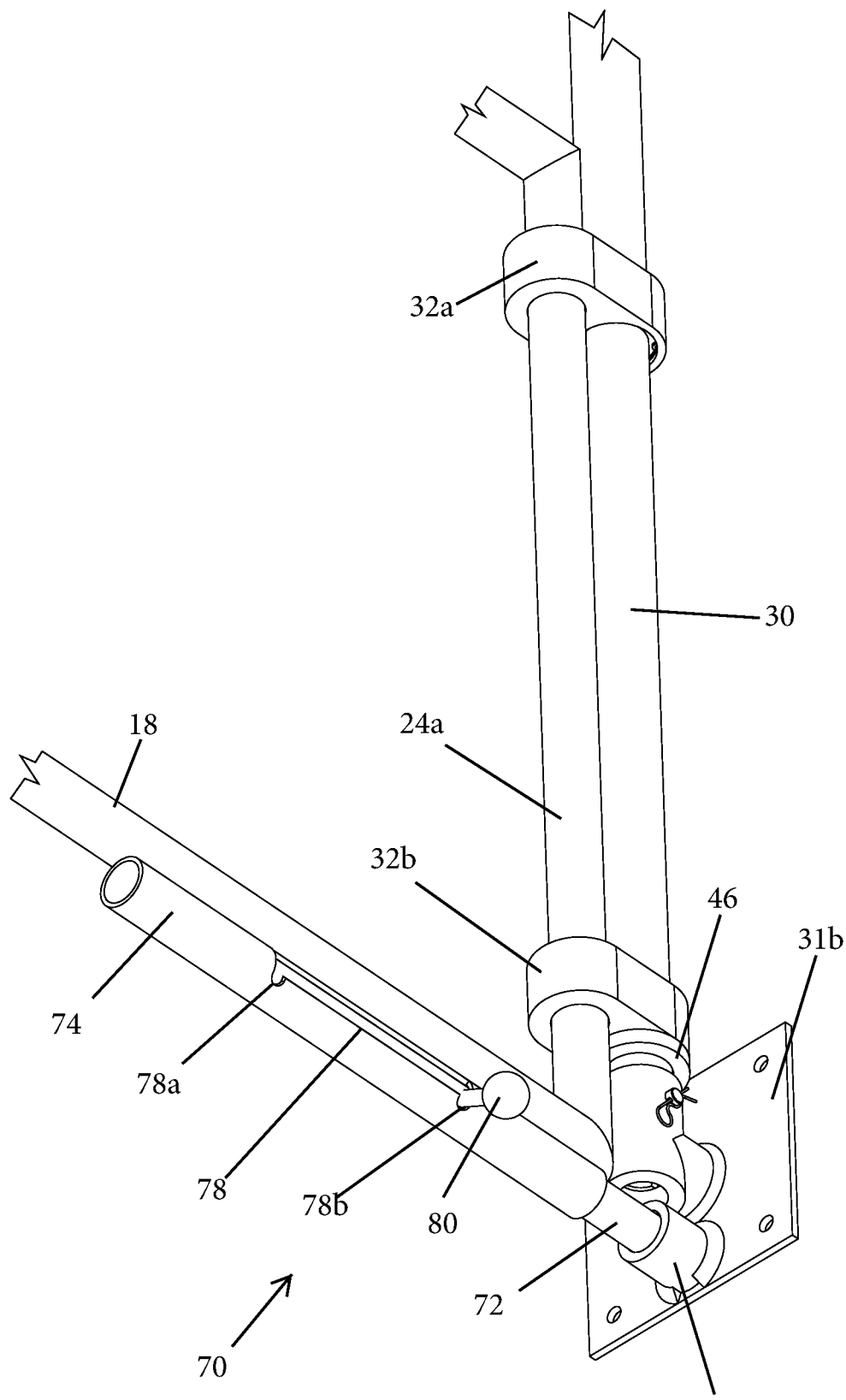
FIG. 9 is an enlarged lower front-side perspective view of a corral securing latch of the extendable rail of FIG. 8

In one embodiment, the deployable corral system 14 includes a multi-purpose securing latch 70 (FIGS. 4A-4B and 8-9) disposed at the proximal end 18a of the extendable corral rail 18 to prevent the deployable corral system 14 from being lifted up when in the deployed configuration, such as by a horse. The securing latch 70 also provides lateral support to the deployable corral system 14, such as in the event that a horse pushes or leans against the extendable corral rail 18. As best shown in FIGS. 8-9, the securing latch 70 includes a sliding pin 72 slideably disposed within a support barrel or tube 74. The sliding pin 72 is telescopically slideable from a disengaged configuration free from the trailer 12 to an engaged configuration wherein one end of the pin 72 is secured with the trailer 12, such as by being inserted into a pin slot or receiver 76 disposed on the lower mounting plate 31b. Optionally, the support barrel 74 includes a key way 78 that allows a handle 80 disposed on the sliding pin 72 to slide through the key way 78, such as shown in FIG. 9. The handle 80 provides an actuation grip for a user. Stops or notches 78a, 78b are provided at each end of the key way 78 to accept the handle 80 and secure the sliding pin 72 in position relative to the support barrel 74 such that the sliding pin 72 is secured from accidental sliding.

Although the illustrated embodiments described above provide for vertically movable corrals relative to an upright wall of a structure, in other embodiments the corral rails may be vertically fixed relative to the upright wall. For vertically fixed embodiments, latches may be provided to retain the extendable corral rails in a substantially perpendicular orientation relative to the wall when the rails are in the deployed configuration. The latches for retaining the rails in the perpendicular orientation may be similar to securing latch 70 described above. However, other forms of securing latches may also be utilized.

As depicted in FIGS. 2A-2D, the deployable corral 14 may include an angle-limiting or retaining element 82 coupled between the extendable corral rail 18 and the respective corral cross-rail 26 to limit the maximum angle between the rails. The limiting element 82 may include a lanyard, a steel cable, or a collapsible or foldable strut 82a (FIGS. 2B-2D) that becomes taut once the corral cross-rail 26 has been moved to the maximum permitted angle relative to the extendable corral rail 18. Optionally, a feed container or water trough 84 may be coupled to or suspended from the limiting element 82 and/or from upper or lower rails of the extendable corral rail 18 and cross-rail 26 when the corral system 14 is in the deployed configuration (FIG. 2A). The container/trough 84 may include multiple sections for containing various materials, such as different types of livestock feed and/or different liquids. The container trough 84 may define various structural forms, such as a rigid container 84a configured to mount at the joint between the extendable corral 18 and the corral cross-rail 26 (FIG. 2B), a soft-sided container 84b configured to mount at the joint between the extendable corral 18 and the corral cross-rail 26 (FIG. 2C), and a rigid container 84c with a water cup 90 (FIG. 2D).

The rigid container 84a of FIG. 2B includes an upper hang-over angled support 85 having an inverted-U cross section to form an open-bottom channel with one leg that receives an upper rail of the corral cross-rail 26 and another leg that receives an upper rail of the extendable corral rails 18 (FIG. 2B). In this manner, the angled support 83 of the rigid container 84a serves to fix the angle of the corral cross-rail 26 relative to the corresponding corral rail 18 when the rigid container 84a is installed. Optionally, another angled support 83 may be provided at a lower region of the rigid container to engage the lower rails of the cross-rail 26 and the corral rail 18. An opening 85 formed along an interior-facing surface of the rigid container 84a permits access to the contents of the container.

Referring to FIG. 2C, the soft-sided container 84b includes mesh or netting panels to contain hay or other substances. Optionally, other materials may be used to form the panels, including non-porous fabrics with one or more openings similar to the opening 85 described above. The mesh or netting panels of the soft-sided container 84b may be supported between upper angled support pieces 83a that are joined together by a hinge 83b that permits adjustment of the angle between adjacent support pieces 83a to match the angle of the corral cross-rail 26 relative to the corresponding corral rail 18. A collapsible or foldable strut 82a extends between opposite ends of the support pieces 83a, while another collapsible or foldable strut 82a may extend along a lower end of the mesh or netting and attach to lower rails of the corral cross-rail 26 and extendable corral rail 18. Optionally, additional adjacent support pieces 83a may be coupled to the lower rails of the corral cross-rail 26 and extendable corral rail 18 with the lower strut 82a coupled thereto, and with the lower region of the mesh or netting optionally extending downwardly to couple to the strut 82a and/or the lower support pieces 83a.

Referring to FIG. 2D, the container 84c is configured to mount over a tubular rail of the extendable corral rail 18, in a manner similar to the support pieces 83a described above. Optionally, any of the containers 84, 84a, and 84b depicted in FIGS. 2A-2C may include an angle-limiting or retaining element 82 or 82a integrally disposed with the container and configured to limit the maximum angle between the rails 18, 26.

A storage tank 86, such as for storage of potable water, may be provided with the trailer 12 for filling or maintaining water in the water trough or container 84, 84a, 84c (FIGS. 2A, 2B, and 2D). The storage tank 86 may be positioned above the roof of the trailer 12 to create a head of pressure without need for a pump, and may include a hose or tube 88 in fluid communication between the tank 86 and the trough 84 such that water can be transferred from the tank 86 to the trough 84. The tube 88 may be integrally disposed in a portion of the corral rail 18, such as inside a hollow tube that forms a portion of the corral rail 18. Optionally, a valve may be disposed with the tube 88 to selectively control the flow of water through the tube 88 from the tank 86 to the trough 84. The optional features including the limiting element 82, 82a, the feed container/water trough 84, 84a, 84c, and the tube 88 may be coupled to the corral 14 and trailer 12 such that each of these components moves along with the deployable corral system 14 as it deploys or stows.

As noted above, transport trailers with integrated corral systems are not necessarily limited to livestock use, and with little or no modification, may be implemented for different purposes such as portable vendor display booths for goods or services at indoor or outdoor display areas. For example, storage bins supported on corral cross-rail 26 and/or swing gate 28 may be included, or adapted for use as display cases showing or providing access to goods, video displays, pamphlets and brochures, awards, giveaways, and the like, while additional storage or display space may be provided along the exterior side panel 22. Any of the corral cross-rails 26, swing gate 28, and upper corral rails, may be fitted with countertops or table surfaces, shelving, and the like. The shade awning may be printed with company logos or other indicia, with additional display space provided along exterior side panel 22 and/or below the awning's elongate end support rod, along the awning support rods, etc. In addition, living quarters for persons may be provided in livestock trailers, in vehicle (e.g., motorsports) hauling trailers, in vendor display booth trailers, or the like, without departing from the spirit and scope of the present invention.

Thus, the deployable corral system of the present invention may be installed onto or integrated with a transport trailer, such as a livestock trailer, to facilitate different uses of the areas adjacent the trailer's exterior. The deployable corral system includes a deployment assistance mechanism or spring that enables manual or powered deployment and stowage of the components with little or no lifting required by the operator. An optional shade awning deploys automatically or manually to provide shade over a portion of the fenced-in area provided by each corral, and an optional trough deploys from a sidewall of the trailer to facilitate watering the livestock in the corral. An optional powered drive system is operable to perform most of the deployment and stowage steps for the corral with different levels of automation, actuation, and sensing available as desired.

Changes and modifications in the specifically described embodiments can be carried out without departing from the principles of the present invention, which is intended to be limited only by the scope of the appended claims, as interpreted according to the principles of patent law, including the doctrine of equivalents.

The embodiments of the invention in which an exclusive property is claimed are defined as follows:

1. A deployable corral system for mounting to an upright wall, said corral system comprising:
    a pair of extendable corral rails having respective proximal end portions and distal end portions, wherein said proximal end portions are configured for attachment to the upright wall, and said extendable corral rails are movable between an extended position and a retracted position relative to the upright wall;
    a corral cross-rail coupled to said distal end portion of at least one of said extendable corral rails, wherein when said at least one extendable corral rail is in said extended position said corral cross-rail is spaced horizontally away from the upright wall, and when said at least one extendable corral rail is retracted said corral cross-rail is positioned adjacent the upright wall; and
    a deployment assistance system disposed at said proximal end portion of each of said extendable corral rails, each of said deployment assistance systems configured to assist a user in moving the corral system by upwardly biasing said extendable corral rails to offset at least a portion of the weight of respective ones of said extendable corral rails and said corral cross-rail, wherein said deployment assistance systems each comprise:
        a hollow rail defining a body of said lift support mechanism;
        a reciprocating linear biasing element disposed inside of said hollow rail such that an axis of linear movement of said linear biasing element is parallel to a longitudinal axis of said hollow rail;
        a support plate movably disposed around an exterior of said hollow rail, wherein said support plate is movable along a portion of said hollow rail parallel to the longitudinal axis of said hollow rail;
        a slot defined along a portion of said hollow rail, wherein said slot is parallel to the longitudinal axis of said hollow rail; and
        a guide member coupled to said support plate and to said linear biasing element, wherein a portion of said guide member is disposed through said slot between said linear biasing element and said support plate, and said guide member is movable within said slot such that as said linear biasing element moves inside of said hollow rail said guide member and said support plate move with said linear biasing element;
    wherein said extendable corral rails and said corral cross-rail, in the extended position, cooperate with the upright wall to define a corral area.

2. The corral system of claim 1, further comprising a pivotable corral gate disposed at a distal end of said corral cross-rail, said corral gate configured to open and close such that an operator can lead animals through said corral gate into or out of the corral area.

3. The corral system of claim 1, wherein said deployment assistance system comprises a powered drive system including at least one electric or fluid powered actuator.

4. The corral system of claim 1, wherein an upper hinge and a lower hinge are disposed between each extendable corral rail and a vertical support rail coupled to a portion of the upright wall, such that each said extendable corral rail is pivotable and slideable about a vertical axis defined by said vertical support rail.

5. The corral system of claim 1, wherein said support plates and said reciprocating linear biasing elements cooperate to vertically support substantially all of the weight of said extendable corral rails in the retracted positions.

6. The corral system of claim 1, wherein said reciprocating linear biasing element is one chosen from a spring, a hydraulic cylinder, a gas-charged strut, and a pneumatic cylinder.

7. The corral system of claim 1, wherein said corral cross-rail is pivotably coupled to said at least one of said extendable corral rails and configured to pivot between a first position substantially parallel to said at least one of said extendable corral rails, and a second position which said corral cross-rail is set at an obtuse angle relative to said at least one of said extendable corral rails.

8. The corral system of claim 1, further comprising a support leg coupled to each of said extendable corral rails and said corral cross-rail, wherein said support legs are configured to extend downwardly when said extendable corral rails are in the extended position to support said corral rails and said cross-rail against a ground surface.

9. The corral system of claim 1, further comprising a securing latch configured to prevent at least one of said extendable corral rails from being raised.

10. The deployable corral system of claim 1, further comprising a container for livestock feed or water, wherein said container is coupled to at least one of said extendable corral rails and said corral cross-rail, said container defining a hole for access to an interior of said container from said corral area.

11. The deployable corral system of claim 10, wherein said container further comprises a support for mounting at said corral system, said support comprising at least one chosen from:

a hang-over angled support comprising an open-bottom channel configured to receive an upper rail of at least one of said extendable corral rails and said corral cross-rail;

a pair of support pieces coupled together by a hinge, one of said support pieces coupled to one of said extendable corral rails and the other of said support pieces coupled to said corral cross-rail, wherein said hinge permits adjustment of an angle between said support pieces to match an angle between one of said extendable corral rails and said corral cross-rail; and a collapsible strut extending between one of said extendable corral rails and said corral cross-rail.

12. A transport trailer with deployable corral system, comprising:

a plurality of upright walls and a pair of wheels supporting said upright walls;

a pair of pivotally extendable corral rails having respective proximal end portions coupled to said trailer near one of said upright walls, and said extendable corral rails having distal end portions, wherein said extendable corral rails are movable between an extended position and a retracted position relative to said one of said upright walls;

at least one corral cross-rail coupled to said distal end portion of at least one of said extendable corral rails, wherein when said at least one extendable corral rail is in said extended position said corral cross-rail is spaced horizontally away from said one of said upright walls, and when said at least one extendable corral rail is retracted said corral cross-rail is positioned adjacent said one of said upright walls;

a pivotable corral gate disposed at a distal end of said corral cross-rail, said corral gate configured to open and close such that an operator can lead animals through said corral gate;

an upper hinge and a lower hinge disposed between each extendable corral rail and a vertical support rail coupled to a portion of said one of said upright walls, such that said extendable corral rail is pivotable about and slideable along a vertical axis defined by said vertical support rail; and a deployment assistance system for applying an upward biasing force to one of said corral rails, wherein said deployment assistance system comprises:

a hollow rail defining a body of said lift support mechanism;

a reciprocating linear biasing element disposed inside of said hollow rail such that an axis of linear movement of said linear biasing element is parallel to a longitudinal axis of said hollow rail;

a support plate movably disposed around an exterior of said hollow rail, wherein said support plate is movable along a portion of said hollow rail parallel to the longitudinal axis of said hollow rail;

a slot defined along a portion of said hollow rail, wherein said slot is parallel to the longitudinal axis of said hollow rail; and a guide member coupled to said support plate and to said linear biasing element, wherein a portion of said guide member is disposed through said slot between said linear biasing element and said support plate, and said guide member is movable within said slot such that as said linear biasing element moves inside of said hollow rail said guide member and said support plate move with said linear biasing element;

wherein said extendable corral rails, said at least one corral cross-rail, and said corral gate, in the extended position, cooperate with said one of said upright walls to define a corral area.

13. The transport trailer of claim 12, further comprising a securing latch configured to selectively prevent said extendable corral rails from being raised.

14. The transport trailer of claim 12, further comprising:

a water trough coupled to at least one of said extendable corral rails and said corral cross-rail and accessible to an occupant of said corral area; and a water tank disposed on said trailer at a height above said extendable corral rails, said water tank in fluid communication with and operable to fill said water trough.

15. A lift support mechanism for assisting in deploying a deployable corral rail, said lift support mechanism comprising:

a hollow rail defining a body of said lift support mechanism;

a reciprocating linear biasing element disposed inside of said hollow rail such that an axis of linear movement of said linear biasing element is parallel to a longitudinal axis of said hollow rail;

a support plate movably disposed around an exterior of said hollow rail, wherein said support plate is movable along a portion of said hollow rail parallel to the longitudinal axis of said hollow rail;

a slot defined along a portion of said hollow rail, wherein said slot is parallel to the longitudinal axis of said hollow rail; and a guide member coupled to said support plate and to said linear biasing element, wherein a portion of said guide member is disposed through said slot between said linear biasing element and said support plate, and said guide member is movable within said slot such that as said linear biasing element moves inside of said hollow rail said guide member and said support plate move with said linear biasing element.

16. The lift support mechanism of claim 15, wherein said reciprocating linear biasing element is one chosen from a spring, a hydraulic cylinder, a gas-charged strut, and a pneumatic cylinder.

17. A deployable corral rail comprising the lift support mechanism of claim 15, wherein said support plate and said reciprocating linear biasing element cooperate to vertically support substantially all of the weight of said deployable corral rail.

18. The lift support mechanism and deployable corral rail of claim 17, wherein said deployable corral rail is pivotably coupled to said lift support mechanism such that said deployable corral rail is pivotable about the longitudinal axis of said hollow body of said lift support mechanism.

19. The lift support mechanism and deployable corral rail of claim 18, further comprising an upper hinge disposed between an upper portion of said deployable corral rail and said hollow body of said lift support mechanism, and a lower hinge disposed between a lower portion of said deployable corral rail and said hollow body of said lift support mechanism, wherein each of said upper hinge and said lower hinge are movably disposed around an exterior of said hollow rail.

20. The lift support mechanism and deployable corral rail of claim 19, wherein said lower hinge is movably supported by said support plate, such that if said support plate moves upward along said hollow body said lower hinge is forced upward by said support plate, and if said support plate moves downward along said hollow body said lower hinge is permitted to move downward.

21. A deployable corral system for mounting to an upright wall, said corral system comprising:

a pair of pivotably extendable corral rails having respective proximal end portions and distal end portions, wherein said proximal end portions are configured for pivotable attachment to the upright wall, and said extendable corral rails are movable between an extended position and a retracted position relative to the upright wall;

a corral cross-rail coupled to said distal end portion of at least one of said extendable corral rails, wherein when said at least one extendable corral rail is in said extended position said corral cross-rail is spaced horizontally away from the upright wall, and when said at least one extendable corral rail is retracted said corral cross-rail is positioned adjacent the upright wall; and a latch operable to selectively prevent at least one of said extendable corral rails from pivoting relative to the upright wall when said corral rail is in the extended position, said latch comprising a moveable latch pin at a first of said extendable corral rails and the upright wall and a latch pin receiver at a second of said extendable corral rails and the upright wall, wherein said latch pin is aligned and engageable with said latch pin receiver when said extendable corral rail is in the extended position;

wherein said extendable corral rails are in the extended position, said extendable corral rails cooperate with said corral cross-rail and the upright wall to define a corral area.

22. The deployable corral system of claim 21, wherein said corral cross-rail is pivotably coupled to said first extendable corral rail and is configured to pivot between a first position substantially parallel to said first extendable corral rail, and a second position which said corral cross-rail is set at an obtuse angle relative to said first extendable corral rail.

23. The deployable corral system of claim 22, further comprising a retaining element disposed between said first extendable corral rail and said corral cross-rail, said retaining element defining a maximum angle at which said corral cross-rail may be positioned relative to said first extendable corral rail.

24. The deployable corral system of claim 23, wherein said retaining element comprises a container for supporting materials in a manner that permits an occupant of said corral area to access the materials in said container.

* * * * *